United States Patent
Tendo et al.

(10) Patent No.: US 12,371,264 B2
(45) Date of Patent: Jul. 29, 2025

(54) STORAGE SYSTEM, BASE, CONTROL DEVICE, PROGRAM, AND TRANSPORT ROBOT

(71) Applicant: MUJIN, INC., Tokyo (JP)

(72) Inventors: Satoshi Tendo, Tokyo (JP); Isamu Arase, Tokyo (JP)

(73) Assignee: MUJIN, INC., Tokyo (JP)

( * ) Notice: Subject to any disclaimer, the term of this patent is extended or adjusted under 35 U.S.C. 154(b) by 1016 days.

(21) Appl. No.: 17/431,764

(22) PCT Filed: Jun. 28, 2019

(86) PCT No.: PCT/JP2019/025970
§ 371 (c)(1),
(2) Date: Aug. 18, 2021

(87) PCT Pub. No.: WO2020/174711
PCT Pub. Date: Sep. 3, 2020

(65) Prior Publication Data
US 2022/0144546 A1    May 12, 2022

Related U.S. Application Data

(60) Provisional application No. 62/810,363, filed on Feb. 25, 2019.

(30) Foreign Application Priority Data

Apr. 26, 2019  (WO) .................. PCT/JP2019/018116
Apr. 26, 2019  (WO) .................. PCT/JP2019/018127

(51) Int. Cl.
*B65G 1/137*    (2006.01)
*B65G 1/04*     (2006.01)
(Continued)

(52) U.S. Cl.
CPC .......... *B65G 1/1373* (2013.01); *B65G 1/0471* (2013.01); *B66F 9/063* (2013.01); *G05D 1/0212* (2013.01)

(58) Field of Classification Search
CPC .. B65G 1/1373; B65G 1/0471; B65G 57/302; B65G 1/04; B65G 1/00; B65G 1/14; B66F 9/063; G05D 1/0212; G05D 1/02
See application file for complete search history.

(56) References Cited

U.S. PATENT DOCUMENTS 8,628,289 B1 * 1/2014 Benedict .............. B65G 1/0478
414/217
2012/0039693 A1 * 2/2012 Benedict ................. E04H 6/225
414/807
(Continued)

FOREIGN PATENT DOCUMENTS

JP    60-071402 A    4/1985
JP    05-229609 A    9/1993
(Continued)

OTHER PUBLICATIONS

Office Action issued Jan. 24, 2023 in DE Appl. No. 11 2019 006 910.1 (with English language translation).
(Continued)

*Primary Examiner* — Michael Collins
(74) *Attorney, Agent, or Firm* — MEDLER FERRO WOODHOUSE & MILLS PLLC

(57) ABSTRACT

The storage system includes a base that supports a container for accommodating articles and a transport robot for transporting the container. The transport robot has a load unit that can load the container and a lift unit for moving the load unit in the vertical direction. The transport robot has a switch unit for switching between a state in which the base restricts the vertical movement of the container and a state in which the base does not restrict the vertical movement of the container.

(Continued)

When the storage system increases the number of containers supported by the base, the lift unit moves the container to be stored from a position below the support position on the base to the support position in a state in which the base does not restrict the vertical movement of the container. After the container to be stored reaches the support position, the switch unit switches from a state in which the base does not restrict the vertical movement of the container to a state in which the base restricts the vertical movement of the container.

18 Claims, 26 Drawing Sheets

(51) Int. Cl.
    *B66F 9/06*        (2006.01)
    *G05D 1/00*        (2024.01)

(56) References Cited

U.S. PATENT DOCUMENTS

| | | | |
|---|---|---|---|
| 2014/0277689 A1* | 9/2014 | Salichs | B65G 1/065 700/214 |
| 2016/0016731 A1* | 1/2016 | Razumov | B65G 1/0492 414/807 |
| 2017/0357270 A1* | 12/2017 | Russell | G06V 20/10 |
| 2018/0022548 A1* | 1/2018 | Mattern | B65G 1/0407 414/279 |
| 2019/0233209 A1* | 8/2019 | Gravelle | B65G 1/0464 |
| 2022/0017305 A1* | 1/2022 | Larsson | B65G 1/0471 |
| 2024/0025058 A1* | 1/2024 | Johnson | B25J 18/025 |
| 2024/0373793 A1* | 11/2024 | Austrheim | A01G 31/04 |

FOREIGN PATENT DOCUMENTS

| | | |
|---|---|---|
| JP | 2012116651 A | 6/2012 |
| JP | 2016-222465 A | 12/2016 |
| JP | 2017132641 A | 8/2017 |
| JP | 2018-052670 A | 4/2018 |
| WO | 2017090108 A1 | 6/2017 |
| WO | 2018/111189 A1 | 6/2018 |
| WO | 2019/017292 A1 | 1/2019 |

OTHER PUBLICATIONS

International Search Report and Written Opinion issued Sep. 10, 2019 in corresponding International Application No. PCT/JP2019/025970.

* cited by examiner (FIG. 1)
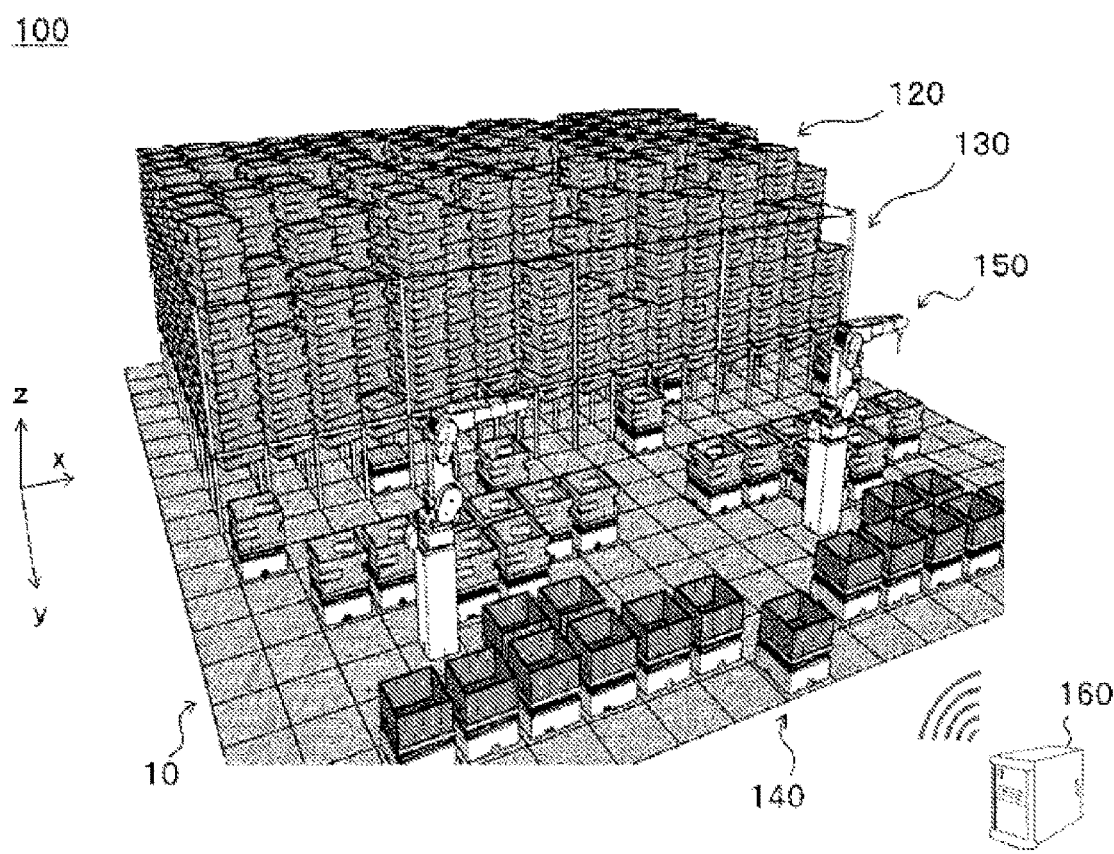

(FIG. 2)
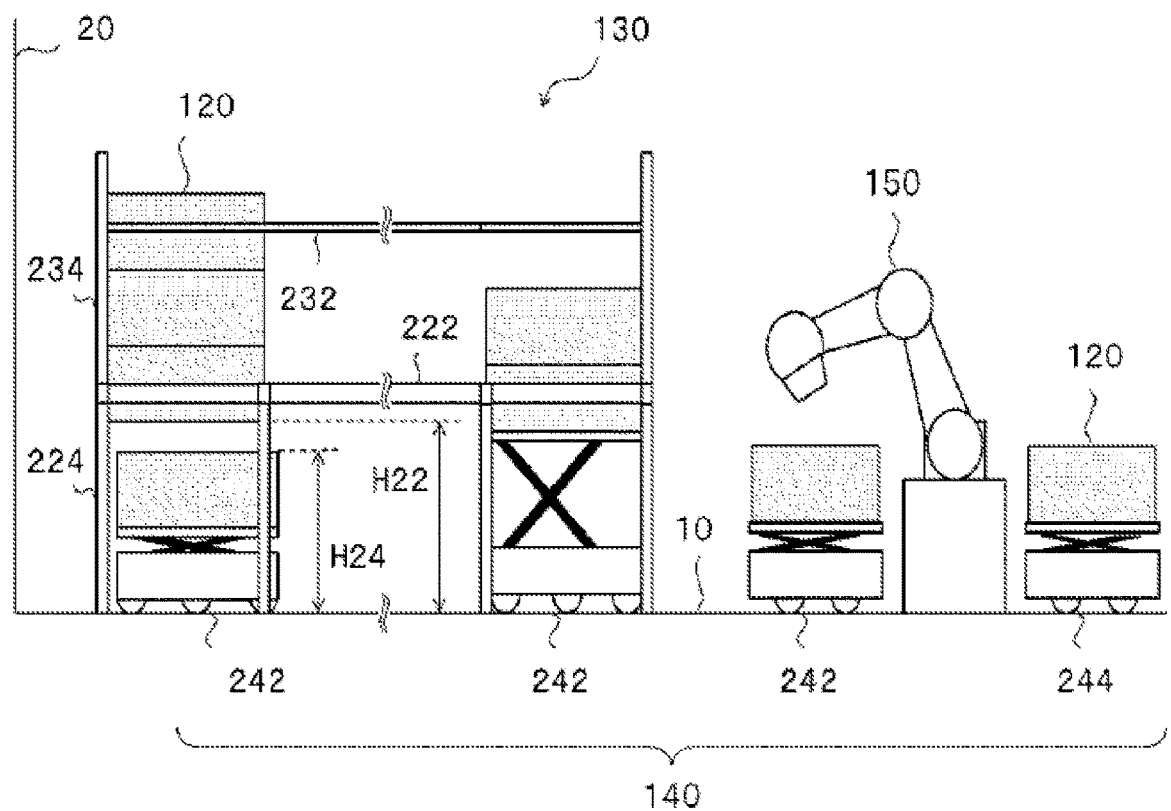

(FIG. 3)
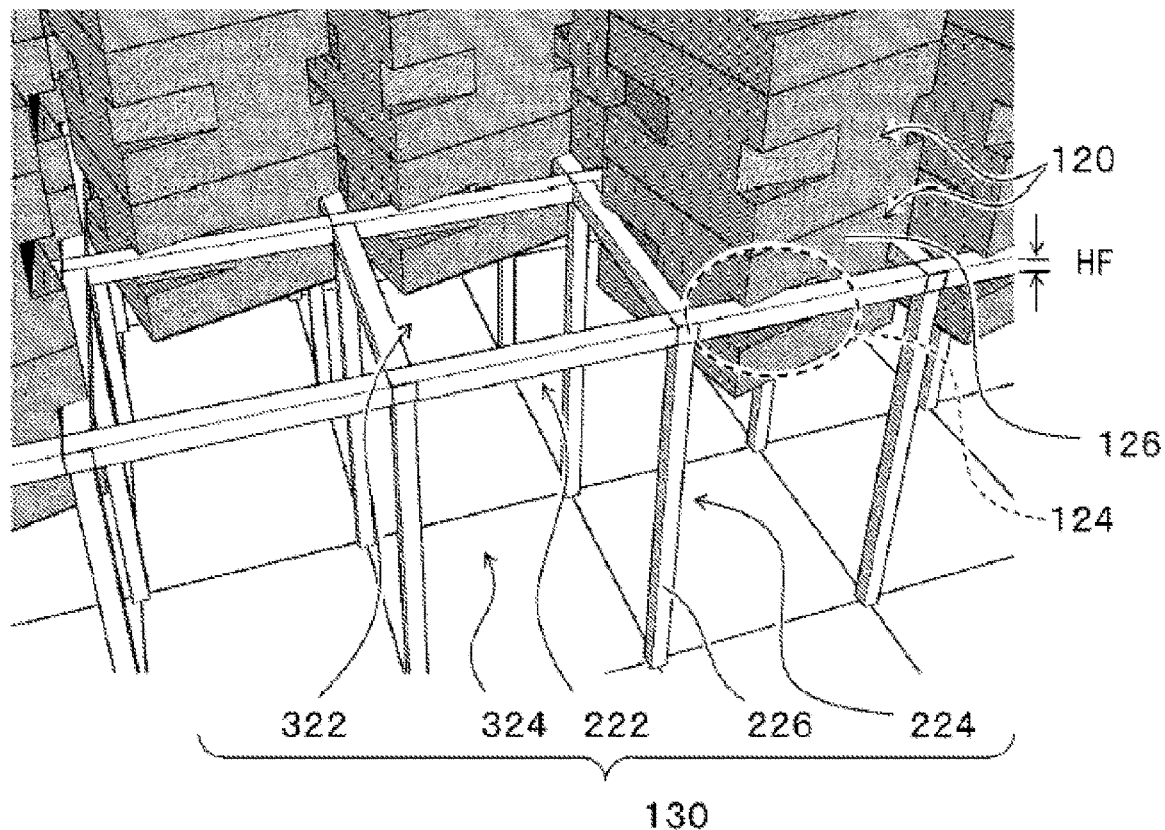

(FIG. 4)
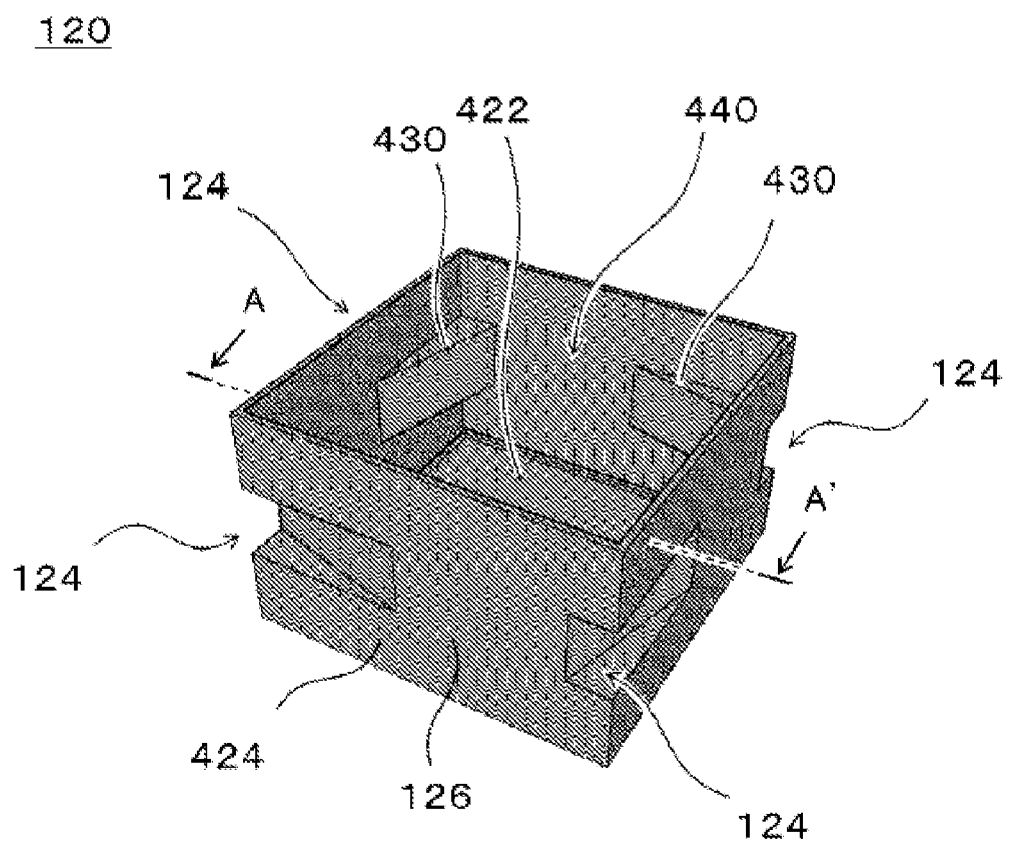

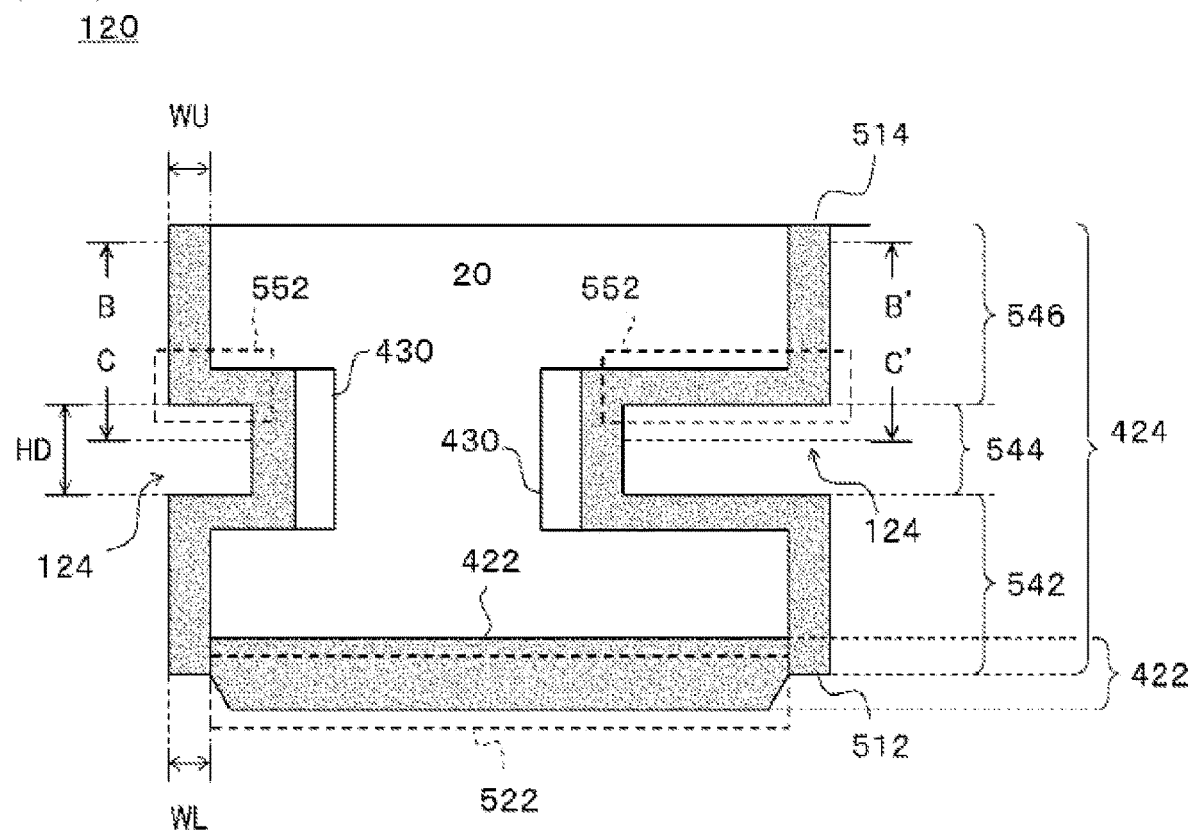
(FIG. 5)

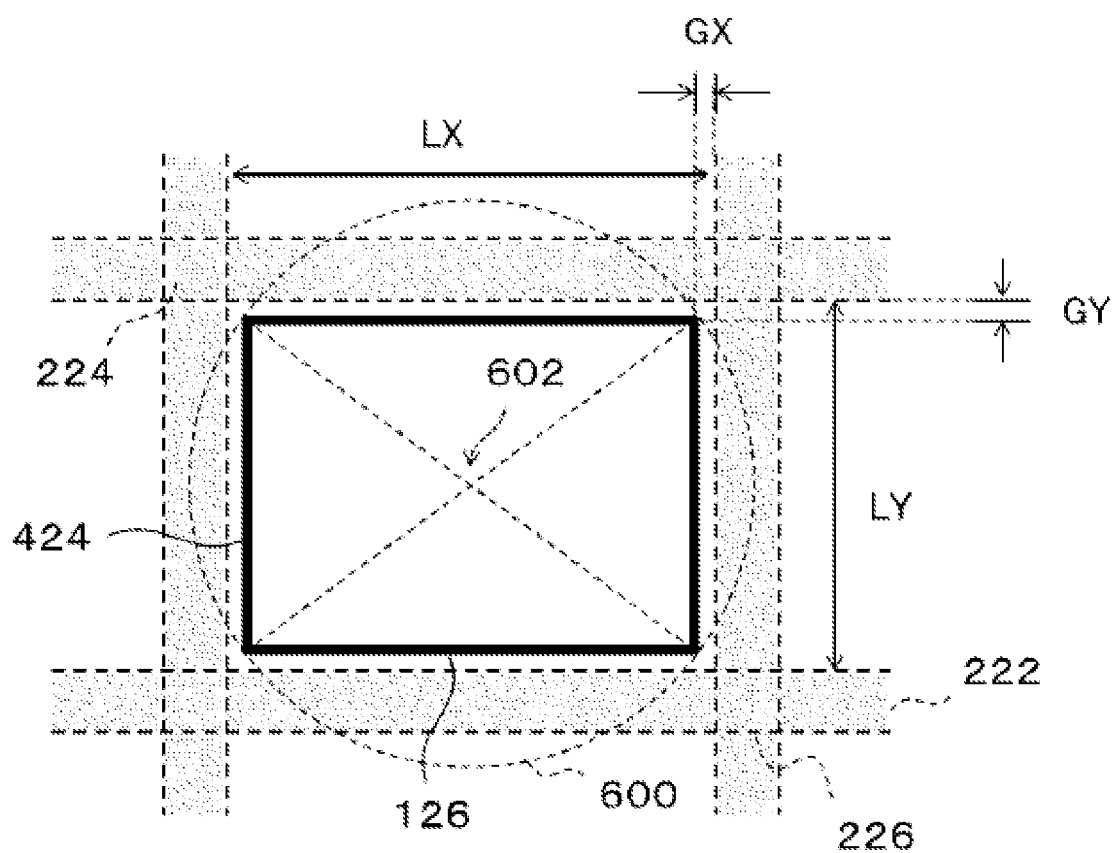
(FIG. 6)

(FIG. 7)
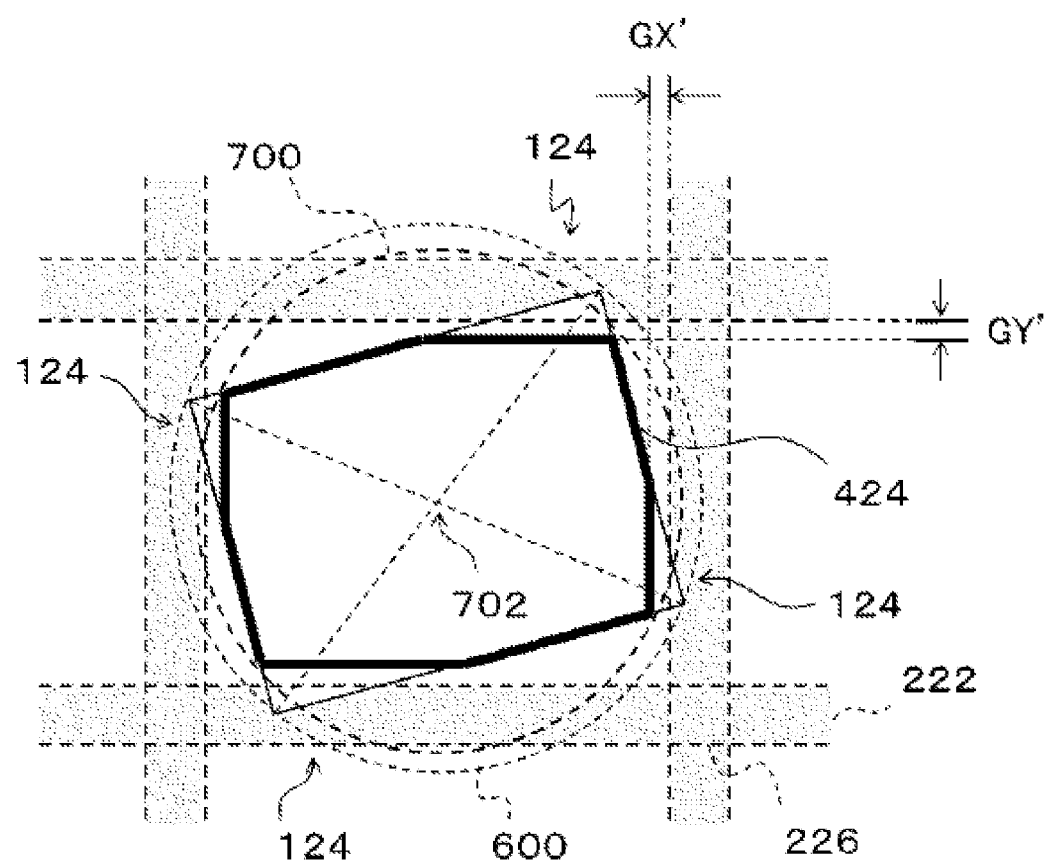

(FIG. 8)
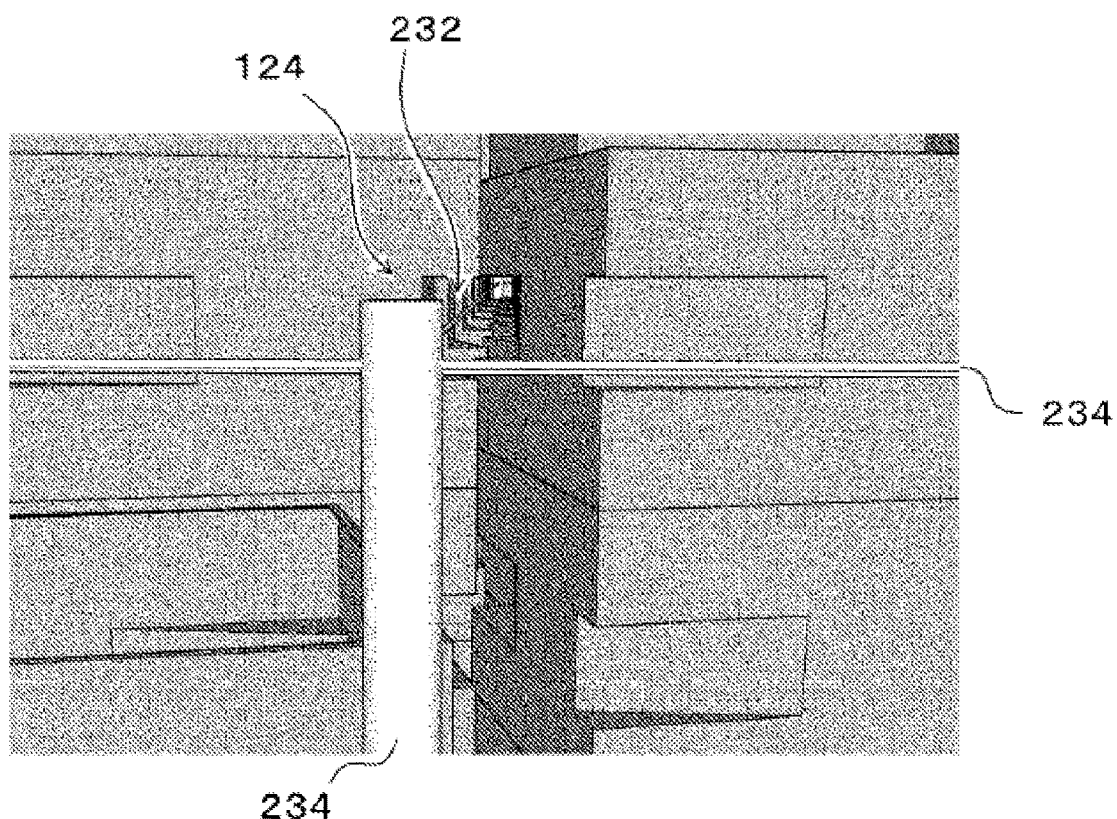

(FIG. 9)
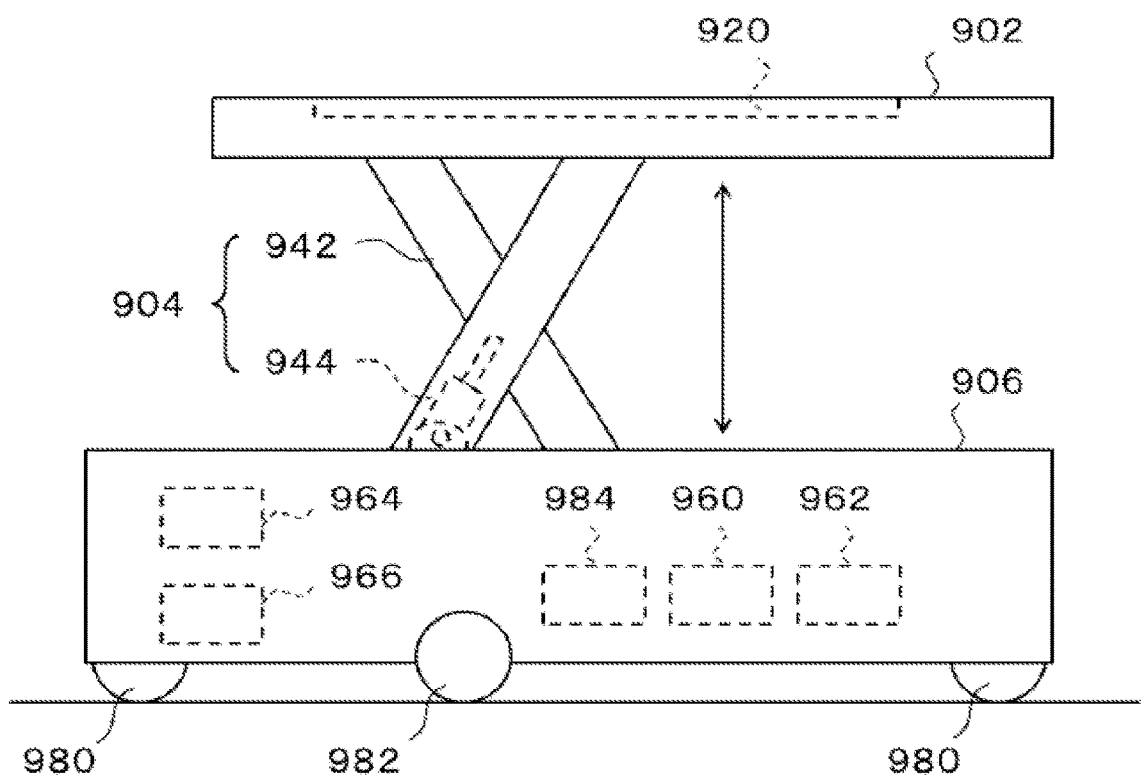

(FIG. 10)
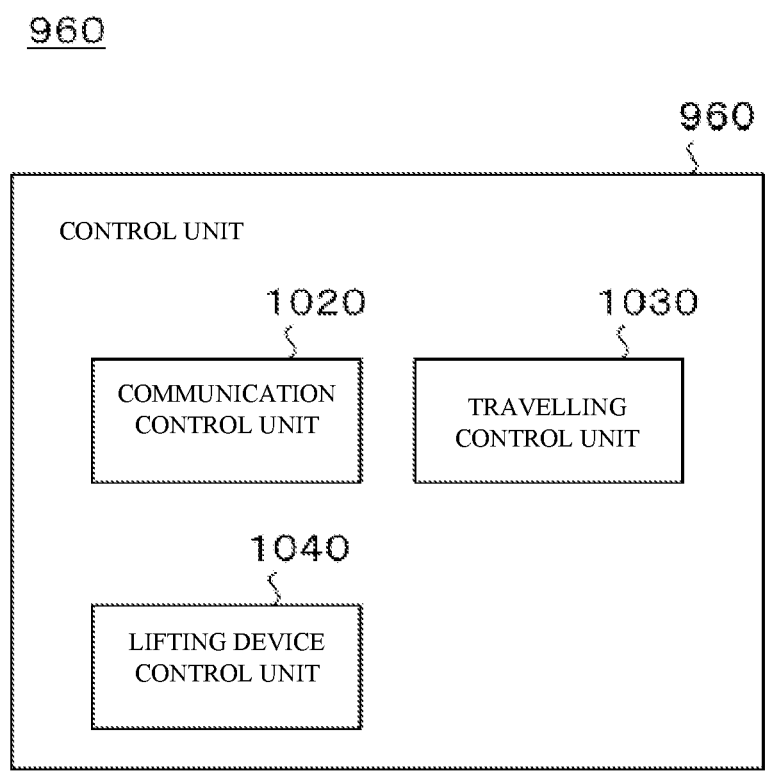

(FIG. 11)
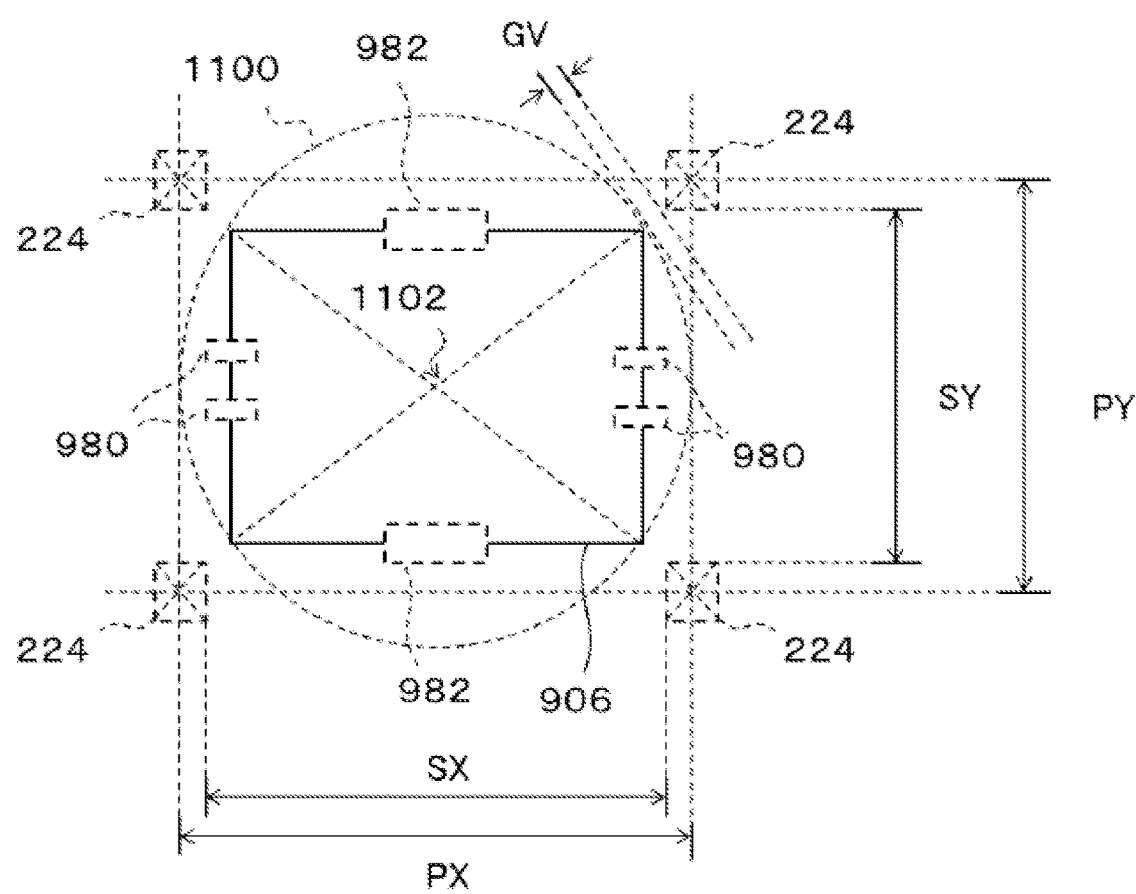

(FIG. 12)
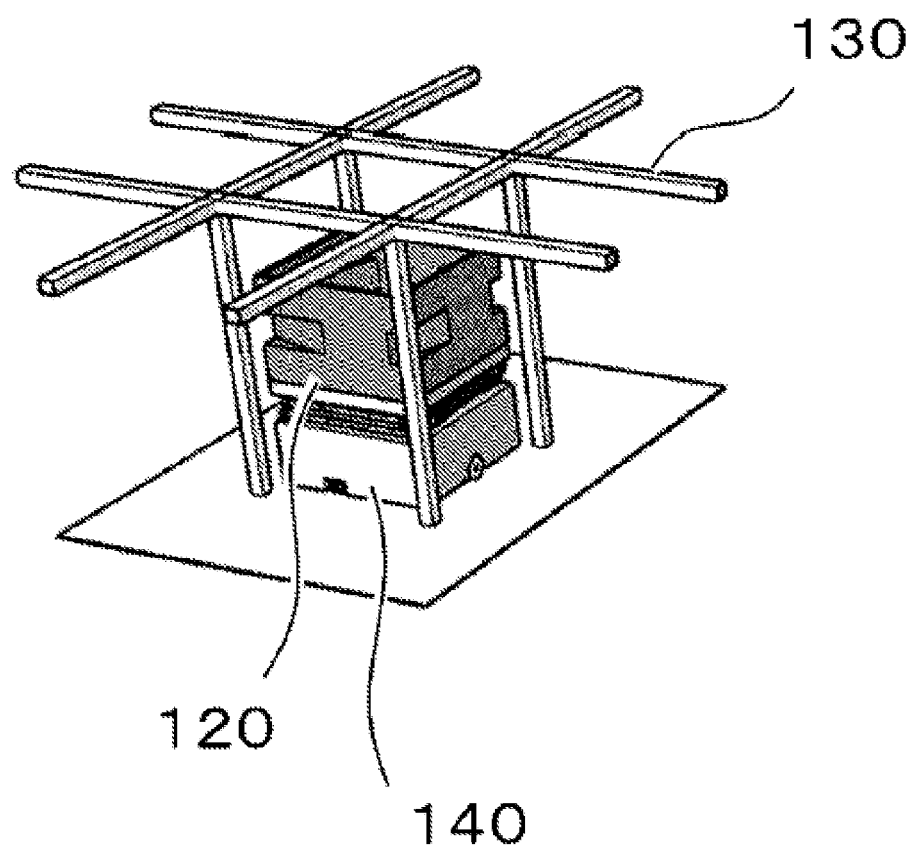

(FIG. 13)
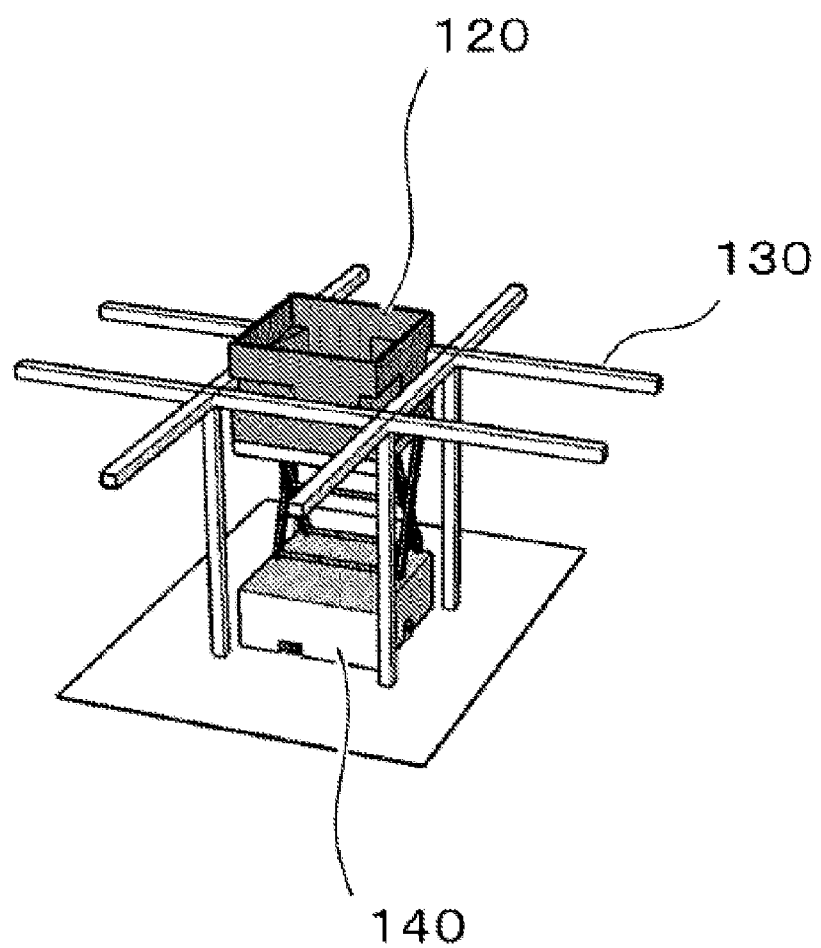

(FIG. 14)
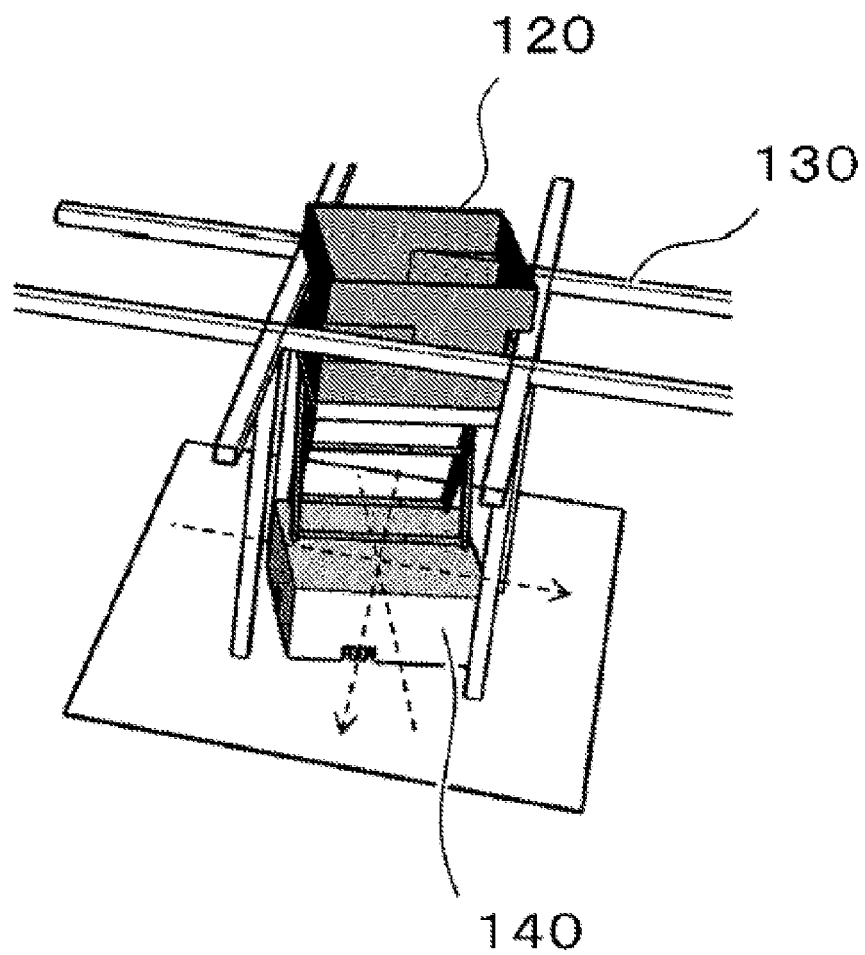

(FIG. 15)
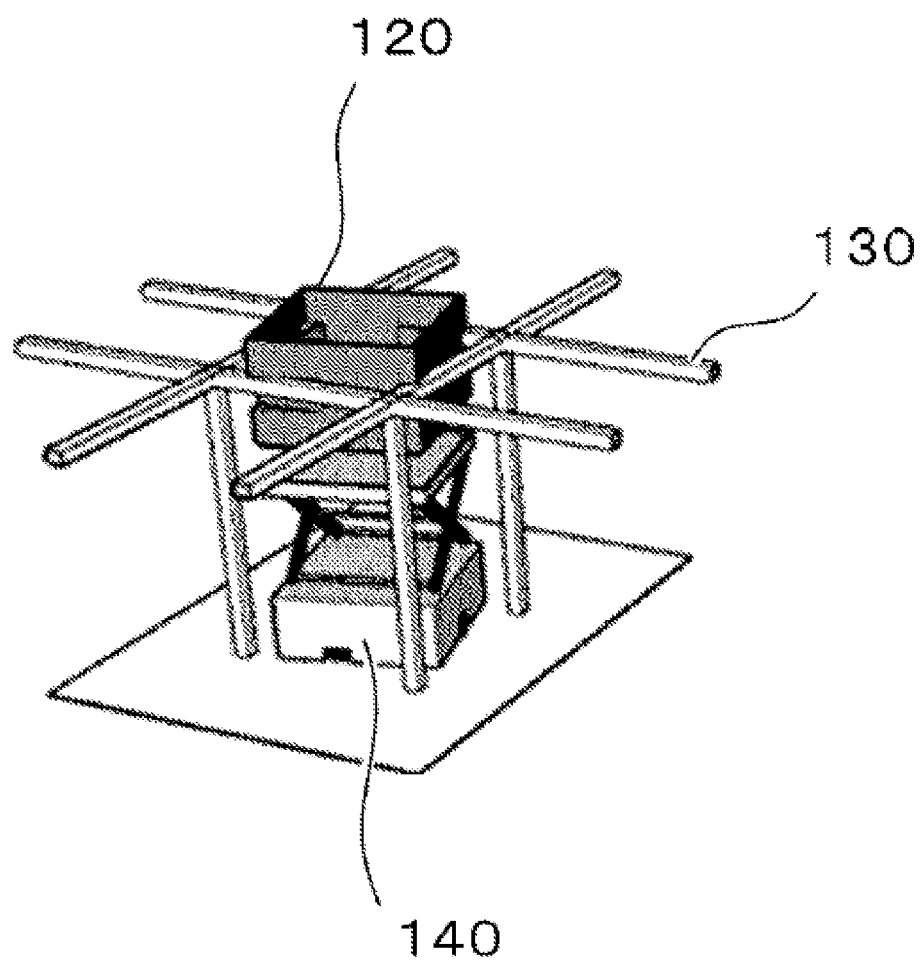

(FIG. 16)
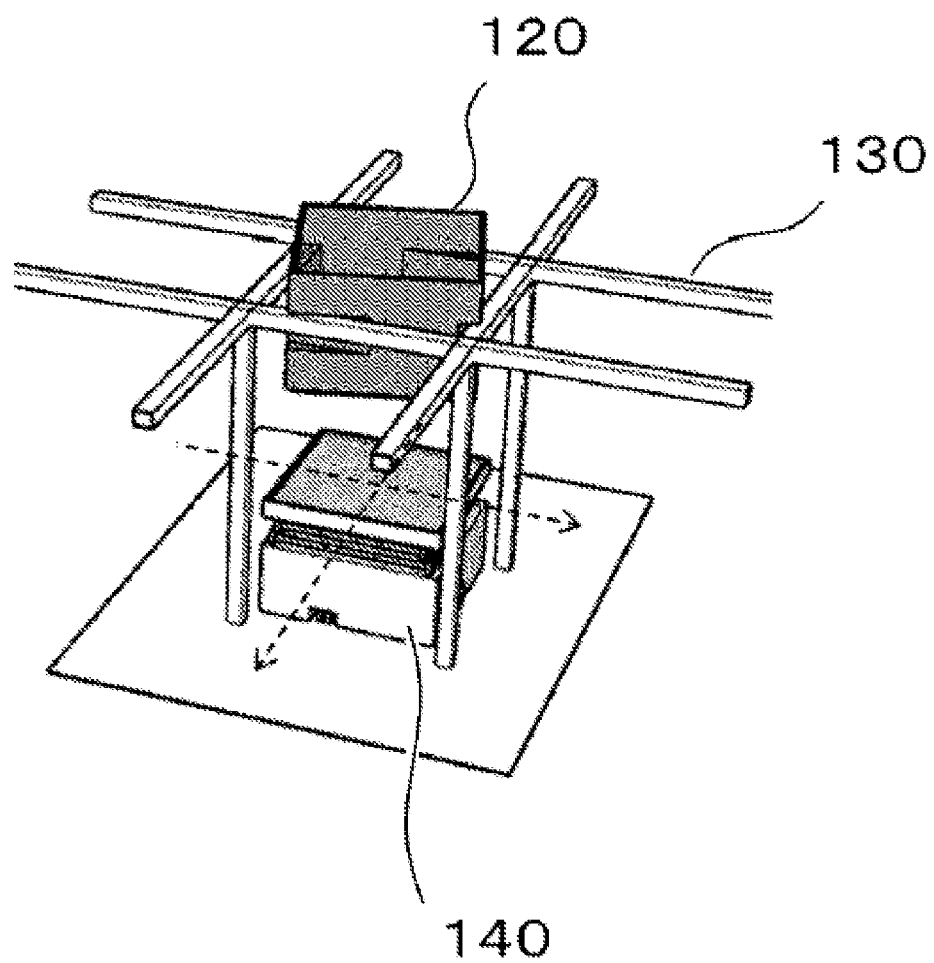

(FIG. 17)
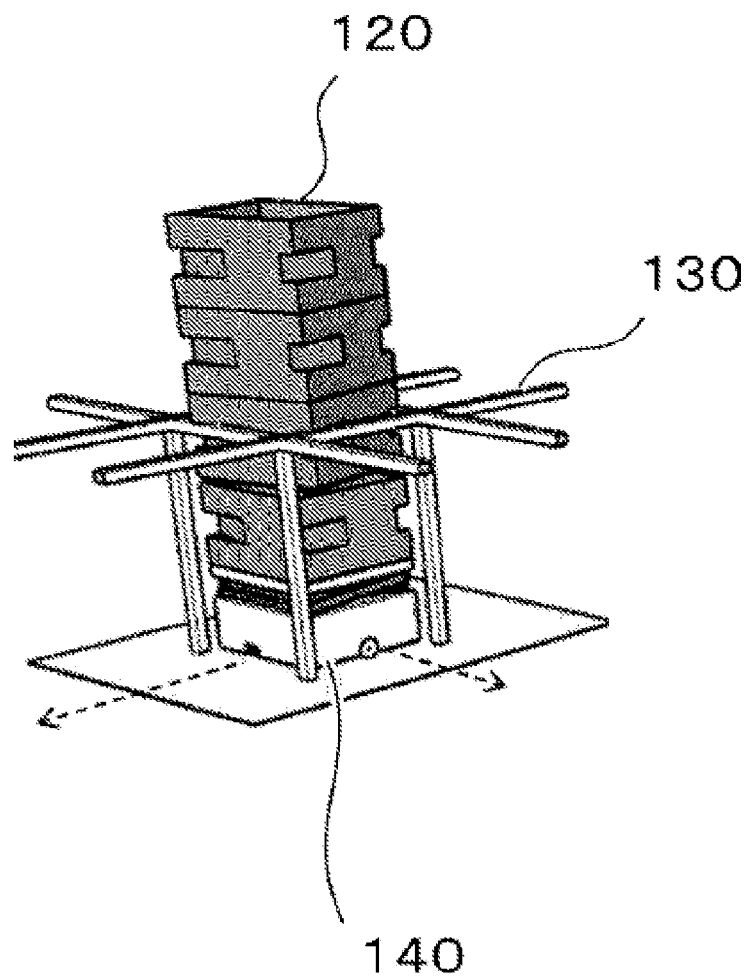

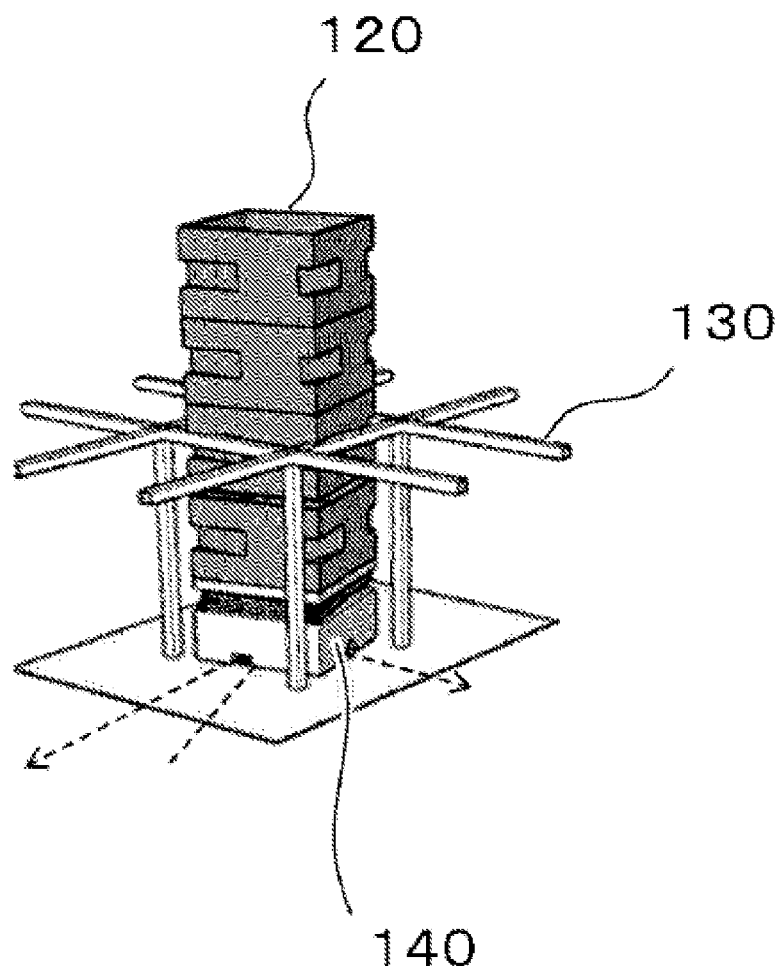
(FIG. 18)

(FIG. 19)
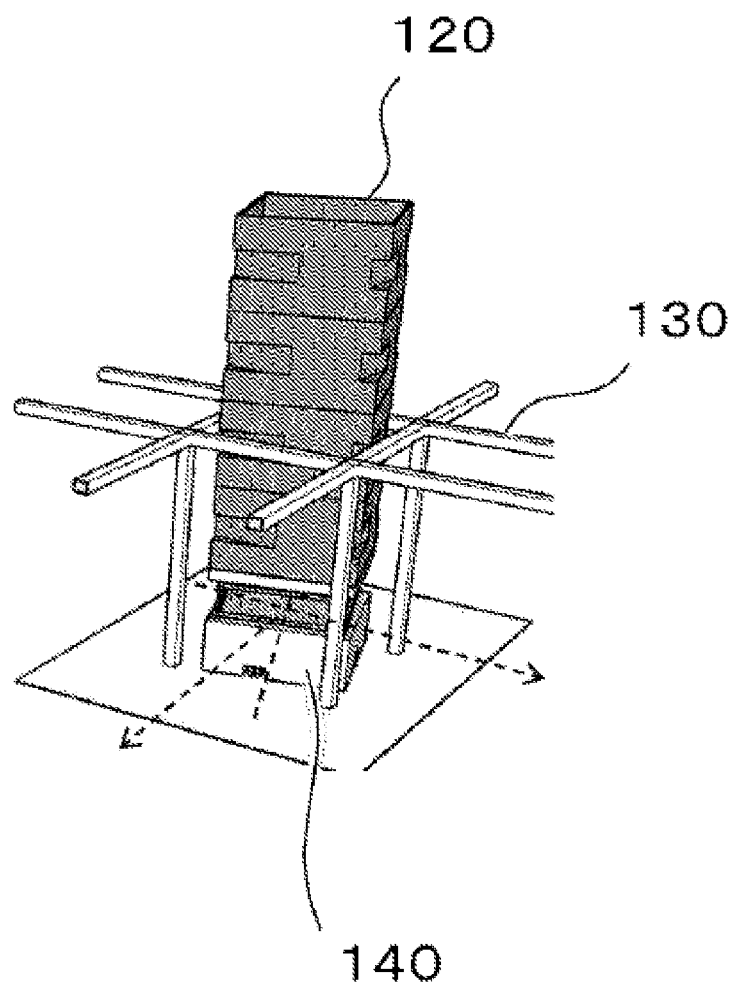

(FIG. 20)
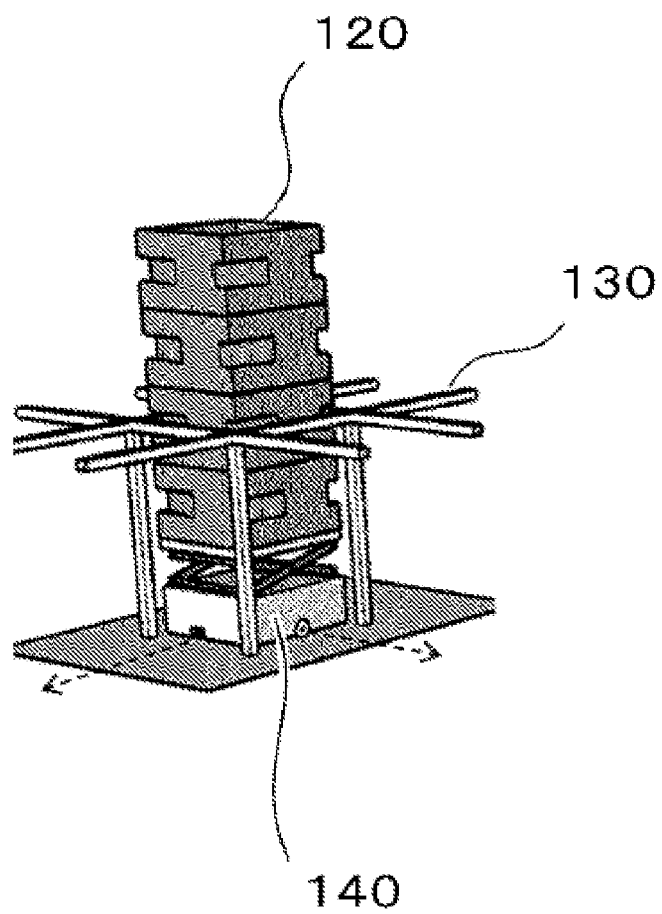

(FIG. 21)
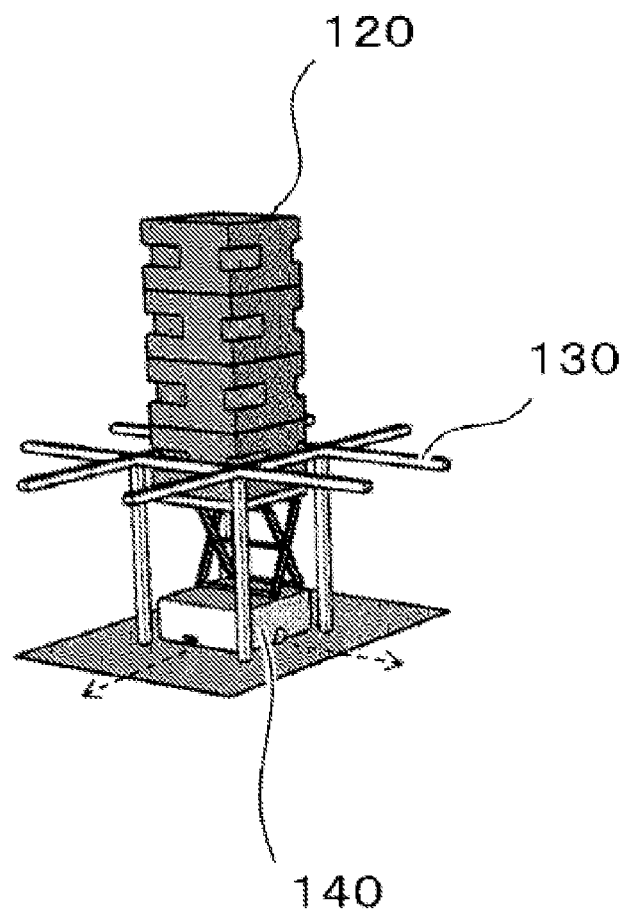

(FIG. 22)
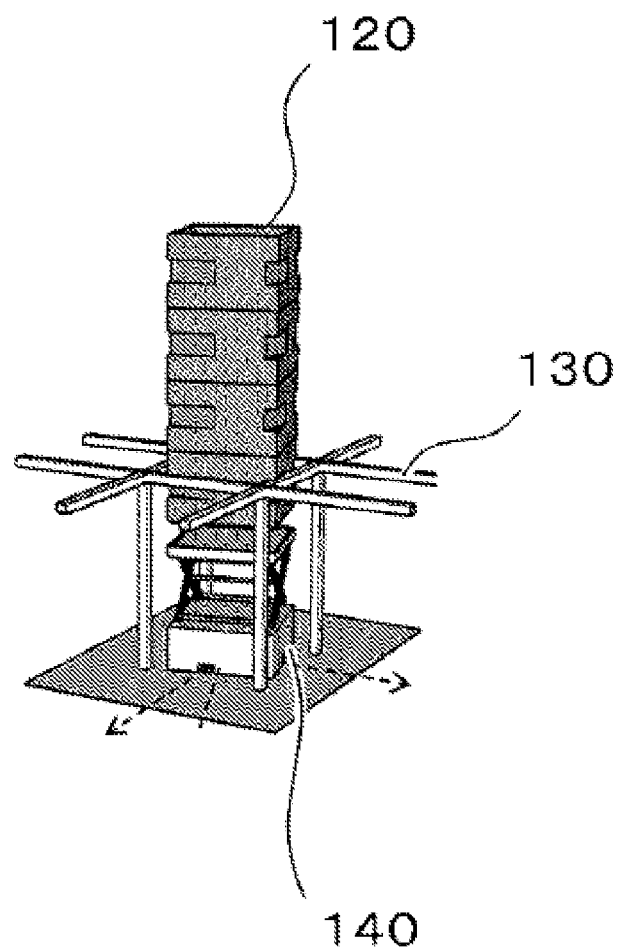

(FIG. 23)
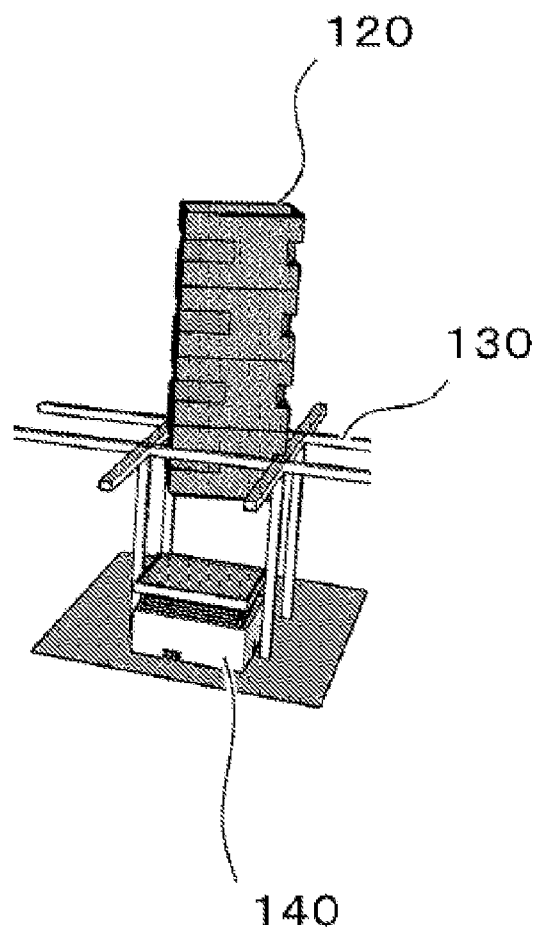

(FIG. 24)
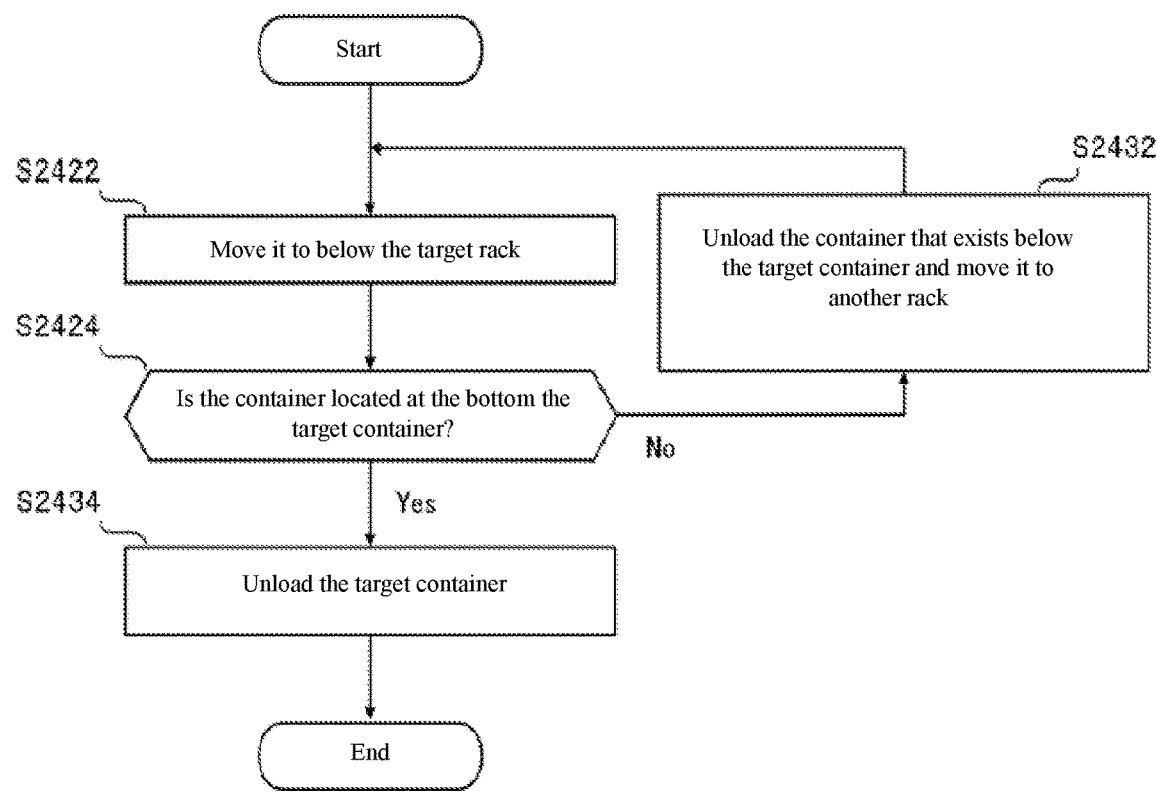

(FIG. 25)
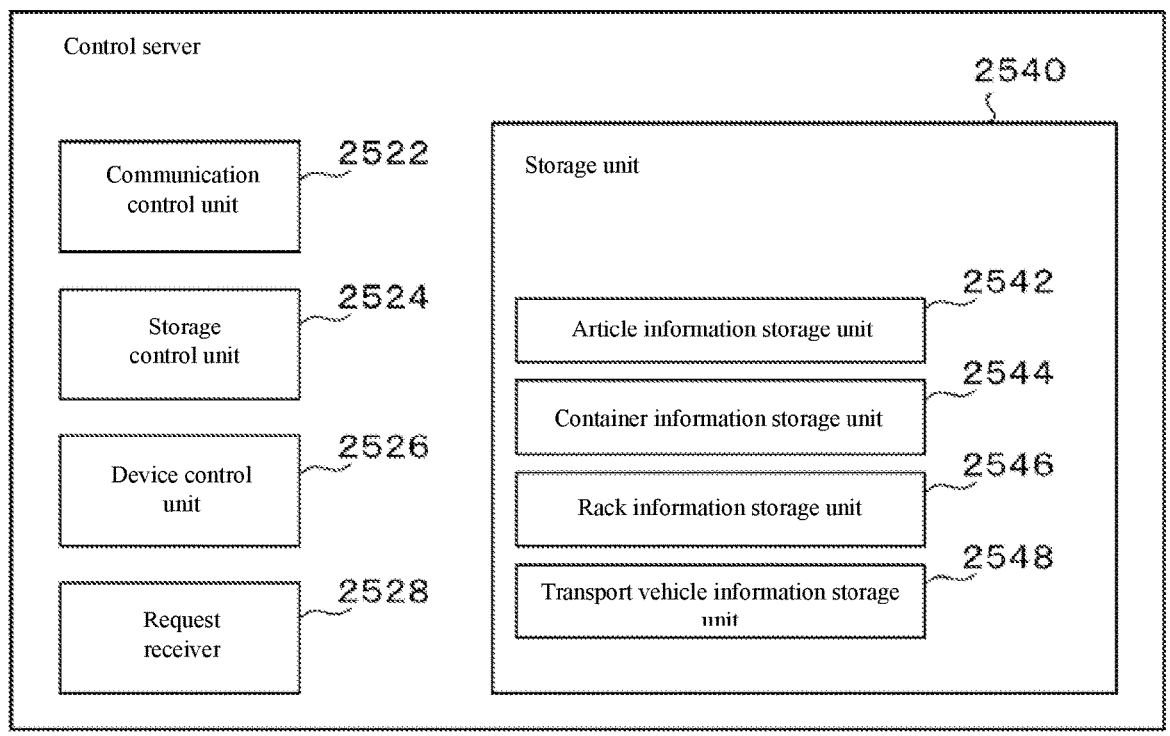

(FIG. 26)
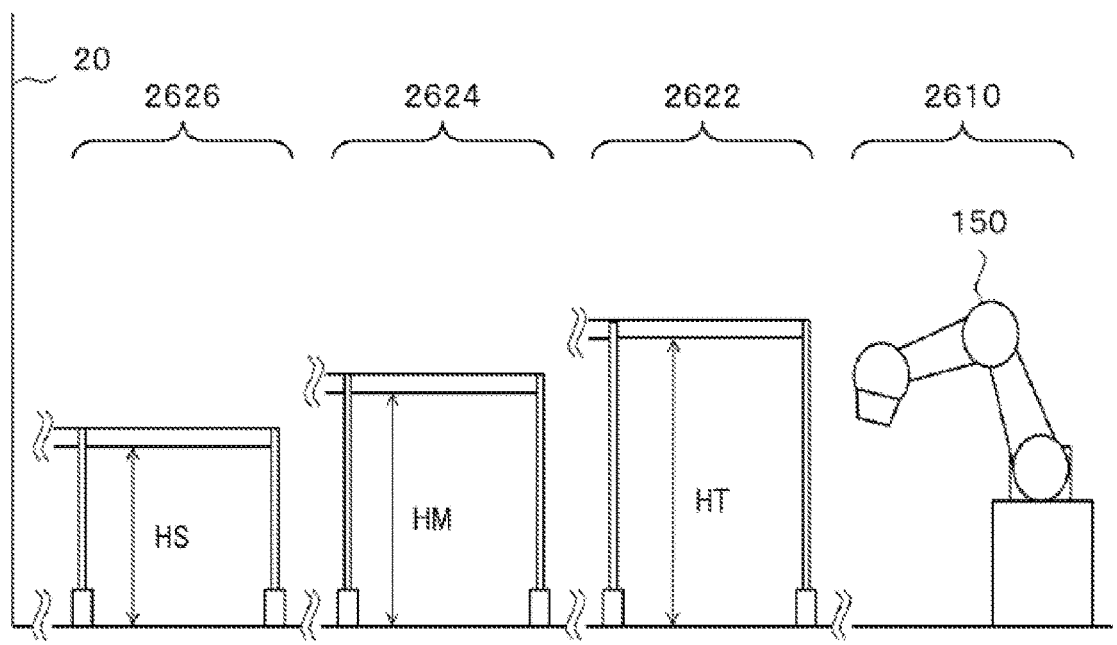

STORAGE SYSTEM, BASE, CONTROL DEVICE, PROGRAM, AND TRANSPORT ROBOT

CROSS-REFERENCE TO RELATED APPLICATION(S)

This application is a 371 National Phase application of International Application No. PCT/JP2019/025970, filed Jun. 28, 2019, which claims priority over U.S. Provisional Patent Application No. 62/810,363 filed on Feb. 25, 2019, and is a continuation in part of International Application No. PCT/JP2019/018116 filed on Apr. 26, 2019, and is a continuation in part of International Application No. PCT/JP2019/018127 filed on Apr. 26, 2019. The International Application No. PCT/JP2019/018116 and International Application No. PCT/JP2019/018127 described above claim priority over the U.S. Provisional Patent Application No. 62/810,363 described above. For designated countries that permit incorporation by reference, all of these applications are incorporated herein by reference.

TECHNICAL FIELD

The present invention relates to a storage system, base, control device, program, and transport robot.

BACKGROUND ART

Three-dimensional automated warehouses equipped with racks for accommodating a large number of containers and a robot for loading and unloading the containers have been known (see, for example, Patent Literatures 1 and 2 and Non-Patent Literature 1).

PRIOR ART LITERATURES

Patent Literatures (Patent Literature 1) Japanese Unexamined Patent Application Publication No. 2012-116651
(Patent Literature 2) Japanese Unexamined Patent Application Publication No. 2017-132641

Non-Patent Literature (Non-Patent Literature 1) Okamura Corporation, "Automatic warehouse type picking system "AutoStore" released in Japan", (online), (searched on the Internet on Oct. 5, 2018), <http://www.okamura.co.jp/company/topics/butsuryu/2014/autostore_1.php>

Problem to be Solved

In conventional parking lots, large and heavy racks are used to increase the storage capacity. Therefore, reducing the size or weight of the rack while suppressing the decrease in storage capacity is desirable.

SUMMARY

In the first aspect of the present disclosure, a storage system is provided. The storage system described above includes, for example, a base that supports a container for accommodating articles. The above storage system includes, for example, a transport robot for transporting a container. In the storage system described above, the transport robot has, for example, a load unit that can load a container. The transport robot has, for example, a lift unit that moves the load unit in the vertical direction. The transport robot has, for example, a switch unit for switching between a state in which the base restricts the vertical movement of the container and a state in which the base does not restrict the vertical movement of the container. In the storage system described above, the lift unit moves, for example, in a state where the base does not restrict the vertical movement of the container, the container to be stored, from a position below the support position of the container on the base, to the support position. In the storage system described above, after the container to be stored reaches the support position, the switch unit, for example, switches from the state in which the base does not restrict the vertical movement of the container to the state in which the base restricts the vertical movement of the container The storage system described above may include an operation control unit for controlling the operation of the transport robot.

In the second aspect of the present disclosure, a storage system is provided. The above storage system stores, for example, articles in a container. The storage system described above comprises, for example, one or more bases.

In the storage system described above, the container comprises, for example, side members having at least a hollow columnar shape. In the storage system described above, the container comprises, for example, a bottom member that closes an opening formed at one end of a side member. In the storage system described above, the container comprises, for example, a first region of the side member extending axially. In the storage system described above, the container comprises, for example, a second region that extends axially along the side member adjacent to the first region. In the first region, the diameter of the first circumscribed circle circumscribing the first cross-sectional shape obtained by cutting the outer circumference of the container in a plane substantially perpendicular to the axial direction of the side member is, for example, in the second region, larger than the diameter of the second circumscribed circle circumscribing the second cross-sectional shape obtained by cutting the outer circumference of the container in a plane substantially perpendicular to the axial direction along the side member. The center of the first circumscribed circle and the center of the second circumscribed circle are arranged, for example, at different positions on the extension axis of the side member.

In the above storage system, each of the one or more bases, for example, supports, from below, the first region of the first container included in one or more containers, so that one or more containers have multiple supports that provide support at a location above the installation surface on which the base is installed. In the storage system described above, each of one or more bases are arranged between, for example, a plurality of supports and an installation surface, and has a plurality of foundations that transmit to the installation surface the load of one or more containers received by the plurality of supports. In the storage system described above, for example, a lifting space in which one or more containers can move in the vertical direction is formed inside the plurality of foundations. In the storage system described above, each of the plurality of supports is arranged, for example, (i) at a position at which the vertical movement of one or more containers in the lifting space is restricted, when the angle formed by the reference surface of side member of one or more container and the reference surface of the base satisfies a predetermined condition, and at a position at which the vertical movement of one or more containers in the lifting space is not restricted when the angle described above does not satisfy the predetermined condition; and (ii) the container located at the bottom of one or more containers supported by the base is arranged at a position that does not restrict the movement of at least one container between the outside of the base and the lifting space.

The storage system may include one or more transport robots. Each of the one or more transport robots may have a load unit on which at least one container can be loaded. Each of one or more transport robots may transport at least one container loaded on the load unit. In the storage system described above, each of the plurality of supports may be arranged in a position where at least one of the one or more transport robots loaded with at least one container can travel below the container located at the bottom of at least one container, even when the base supports one or more containers.

In the storage system described above, each of the one or more transport robots may transport at least one container into the lifting space of the target base of one or more bases. Each of the one or more transport robots may adjust the position of at least one container so that the angle formed by the reference plane of at least one container and the reference plane of the target base does not satisfy a predetermined condition. Each of the one or more transport robots may move the load unit upward until the lower end of the first region of the second container contained in at least one container is located above the upper ends of the plurality of supports of the target base. Each of the one or more transport robots may adjust the position of at least one container so that the angle formed by the reference plane of at least one container and the reference plane of the target base satisfies a predetermined condition. Thereby, in the storage system described above, the number of containers supported by the target base may be increased.

In the storage system described above, each of the one or more transport robots may transport at least one container into the lifting space of the target base of one or more bases. In each of the one or more transport robots may adjust the position of at least one container, so that (i) the extension axis of the side member of the container located at the bottom of at least one container supported by the target base coincides with the extension axis of the side member of at least one container, and (ii) the angle formed by the reference plane of at least one container and the reference plane of the target base satisfies a predetermined condition. Each of the one or more transport robots may move the load unit upwards until the upper end of the container located at the top of at least one container reaches the position that supports the lower end of the container located at the bottom of at least one container supported by the target base. Each of the one or more transport robots may adjust the position of at least one container so that the angle formed by the reference plane of at least one container and the reference plane of the target base does not satisfy a predetermined condition. Each of the one or more transport robots may move the load unit upward until the lower end of the first region of the second container contained in at least one container is located above the upper ends of the plurality of supports of the target base. Each of the one or more transport robots may adjust the position of at least one container so that the angle formed by the reference plane of at least one container and the reference plane of the target base satisfies a predetermined condition. Thereby, the storage system described above may increase the number of containers supported by the target base.

In the storage system described above, each of the one or more transport robots may move to the inside of the lifting space of the target base of at least one base. Each of the one or more transport robots may adjust the position of the load unit or the container located at the top of at least one container loaded on the load unit to a specific position below the first container supported by the target base. Each of the one or more transport robots may lift the load unit until the load unit or the container located at the top of at least one container loaded on the load unit supports the container located at the bottom of at least one container supported by the target base.

Each of the one or more transport robots may adjust the position of at least one container so that the angle formed by the reference plane of the first container and the reference plane of the target base does not satisfy a predetermined condition. Each of one or more transport robots may move the load unit downward until the vertical distance from the lower end of the first region of the third container located above the first container, among at least one container supported by the target base, and the upper ends of the plurality of supports of the target base is 0 or within a predetermined positive numerical range. Each of the one or more transport robots may adjust the position[s] of one or more containers so that the angle formed by the reference surface of the third container and the reference surface of the target base satisfies a predetermined condition. Thereby, the storage system described above may reduce the number of containers supported by the target base.

In the storage system described above, the predetermined positive numerical range may be set, so that the upper end of the first region of the container located one below the third container, in at least one container supported by the target base, is located below the lower ends of the plurality of supports of the target base, when the vertical distance between the lower end of the first region of the third container and the upper ends of the plurality of supports of the target base is within the predetermined positive numerical range.

In the storage system described above, each of the one or more transport robots may move to the inside of the lifting space of the target base among the one or more bases. Each of one or more transport robots may adjust the position of the load unit or the container located at the top of at least one container loaded on the load unit to a specific position below the first container supported by the target base. Each of the one or more transport robots may lift the load unit until the load unit or the container located at the top of at least one container loaded on the load unit supports the container located at the bottom of at least one container supported by the target base. Each of the one or more transport robots may adjust the position of at least one container so that the angle formed by the reference plane of the first container and the reference plane of the target base does not satisfy a predetermined condition. Each of the one or more transport robots may move the load unit downwards until the upper end of the first region of the first container supported by the target base is located below the lower ends of the plurality of supports of the target base. Thereby, the storage system described above may reduce the number of containers supported by the target base.

In the storage system described above, each of the one or more bases may support a plurality of first containers contained in the one or more containers from below to support one or more containers at a position above the installation surface on which the base is installed. The storage system described above may include an operation control unit for controlling the operation of the transport robot.

In the third aspect of the present disclosure, a base is provided. The base supports, for example, a container for accommodating articles.

In the base described above, the container includes, for example, a side member having at least a part having a hollow columnar shape. In the base described above, the container includes, for example, a bottom member that closes an opening formed at one end of a side member. In base described above, the container includes, for example, a first region extending in the axial direction of the side member. In the base described above, the container includes, for example, a second region extending in the axial direction of the side member adjacent to the first region. In the first region, the diameter of the first circumscribed circle circumscribing the first cross-sectional shape obtained by cutting the outer circumference of the container in a plane substantially perpendicular to the axial direction of the side member is, for example, in the second region, larger than the diameter of the second circumscribed circle circumscribing the second cross-sectional shape obtained by cutting the outer circumference of the container in a plane substantially perpendicular to the axial direction of the side member. The center of the first circumscribed circle and the center of the second circumscribed circle are arranged, for example, at different positions on the extension shaft of the side member.

The base supports, for example, from below the first region of the first container included in one or more containers, and has a plurality of supports for supporting one or more containers at a position above the installation surface on which the base is installed. The base has, for example, a plurality of foundations that are arranged between a plurality of supports and an installation surface and that transmit to the installation surface the load of one or more containers received by the plurality of supports. In the base described above, for example, a lifting space in which one or more containers can move in the vertical direction is formed inside the plurality of foundations. In the base, each of a plurality of supports is arranged, for example, (i) at a position in which the vertical movement of one or more containers in the lifting space is restricted, when the angle formed by the reference surface of side member of the one or more containers and the reference surface of the base satisfies a predetermined condition, and at a position in which the vertical movement of one or more containers in the lifting space is not restricted, when the angle does not meet the predetermined conditions, (ii) at a position in which the container located at the bottom of one or more containers supported by the base is arranged in a position that does not restrict the movement of at least one container between the outside of the base and the lifting space.

In the base, the plurality of foundations may have four strut members. The plurality of supports may have four beam members. Each of the four strut members may be arranged so that one end is in contact with the installation surface. On the installation surface, (i) the length of the diagonal line of the quadrangle circumscribing the four strut members may be larger than the diameter of the first circumscribed circle or the minimum rotation diameter of the transport robot for transporting a container. On the installation surface, (ii) the length of each side of the quadrangle may be smaller than the diameter of the first circumscribed circle or the minimum rotation diameter. On the installation surface, (iii) the maximum value of the length of each side of the quadrangle may be larger than the width required for the passage of the transport robot loaded with a container. Each of the four beam members may be supported by two strut members. Each of the four beam members may be arranged so that the distance between the installation surface and the lower end of the beam member is at a position larger than the height required for the passage of the transport robot loaded with a container, so that the stretching direction of the beam member and the stretching direction of the two strut members are substantially perpendicular to each other. In the base, the minimum rotation diameter may be the diameter of the circle drawn by the outermost part of the transport robot, when the transport robot turns by operating the steering wheel to the maximum, or when the transport robot rotates on the spot about an axis substantially perpendicular to the installation surface.

The above-mentioned base may include a fall prevention member for preventing one or more containers supported by the base from toppling over.

In the fourth aspect of the present disclosure, a control device is provided. The control device described above controls, for example, a transport robot. In the control device, the transport robot is used, for example, to transport a container for accommodating articles and store the container on a base.

In the control device described above, the container includes, for example, side members having at least a part having a hollow columnar shape. In the control device, the container includes, for example, a bottom member that closes an opening formed at one end of a side member. In the control device, the container includes, for example, a first region extending in the axial direction of the side member. In the control device, the container includes, for example, a second region adjacent to the first region and extending in the axial direction of the side member. In the first region, the diameter of the first circumscribed circle circumscribing the first cross-sectional shape obtained by cutting the outer circumference of the container in a plane substantially perpendicular to the axial direction of the side member is, for example, in the second region, larger than the diameter of the second circumscribed circle circumscribing the second cross-sectional shape obtained by cutting the outer circumference of the container in a plane substantially perpendicular to the axial direction. The center of the first circumscribed circle and the center of the second circumscribed circle are arranged, for example, at different positions on the extension shaft of the side member.

In the control device, the base includes, for example, a plurality of supports that support the container at a position above the installation surface on which the base is installed by supporting the first region of the container from below. In the above control device, the base is provided, for example, between a plurality of supports and an installation surface, and includes a plurality of foundations that transmit to the installation surface the load of the container received by the plurality of supports. In the control device described above, for example, a lifting space, in which the container can move in the vertical direction, is formed inside the plurality of foundations. In the control device described above, each of the plurality of supports is arranged in a position, for example, (i) in which the vertical movement of the container in the lifting space is restricted when the angle formed by the reference surface of the side member of the container and the reference surface of the base satisfies a predetermined condition, and the movement of the container in the vertical direction is not restricted, when the angle does not satisfy the predetermined conditions; (ii) in which the container supported by the base does not restrict the movement of other containers between the outside of the base and the lifting space.

In the control device, the transport robot includes, for example, a load unit on which a container can be loaded. In the control device, the transport robot includes, for example, a lift unit for moving the load unit in the vertical direction. In the control device, the transport robot includes, for example, a moving unit for moving the transport robot.

In the control device, for example, the moving unit moves the transport robot to execute a procedure of transporting a container into the lifting space of the base. The control device described above, for example, allows the moving unit to move the transport robot to execute a procedure for adjusting the position of the container so that the angle between the reference plane of the container and the reference plane of the base does not satisfy the predetermined conditions. The control device, for example, allows the lift unit to move the load unit upward to execute a procedure in which the lower end of the first region of the container is arranged above the upper ends of the plurality of supports of the base. The control device, for example, allows the moving unit to move the transport robot to execute a procedure of adjusting the position of the container so that the angle formed by the reference plane of the container and the reference plane of the base satisfies a predetermined condition.

The control device may perform a procedure in which the moving unit moves the transport robot to the lifting space of the base. The control device may perform a procedure in which the moving unit moves the transport robot so that the position of the load unit or the container located at the top of at least one container loaded on the load unit is adjusted to a specific position below the container supported on a base. The control device may perform a procedure in which the lift unit moves the load unit upward, so that the load unit or the container located at the top of at least one container loaded on the load unit supports the container supported by the base. The control device may perform a procedure in which the moving unit moves the transport robot to adjust the position of the container so that the angle between the reference surface of the container and the reference surface of the base does not satisfy a predetermined condition. The control device may perform a procedure in which the lift unit moves the load unit downward to arrange the upper end of the first region of the container supported by the base below the lower ends of the plurality of supports of the base.

In a fifth aspect of the disclosure, a program is provided. The program may be a program for operating a computer to function as a control device. The program may be a program for allowing a computer to execute an information processing procedure in a control device. The control device may be the control device according to the fourth aspect described above. Further, a computer-readable medium for storing the program described above may be provided. The computer-readable medium may be a non-transitory computer-readable medium. The computer-readable medium may be a computer-readable recording medium.

In a sixth aspect of the present disclosure, a transport robot is provided. The transport robot described above includes, for example, a control device. The control device may be the control device according to the fourth aspect. The transport robot described above includes, for example, a load unit. The transport robot includes, for example, a lift unit. The transport robot includes, for example, a moving unit.

The outline of the disclosure described above does not list all the necessary features of the present disclosure. Sub-combinations of these feature groups can also be considered part of the disclosure.

BRIEF DESCRIPTION OF THE DRAWINGS

FIG. 1 schematically shows an example of the inside of an automated warehouse 100.

FIG. 2 schematically shows an example of the system configuration of the automated warehouse 100.

FIG. 3 schematically shows an example of a container storage method in the automated warehouse 100.

FIG. 4 schematically shows an example of a container 120.

FIG. 5 schematically shows an example of a cross-sectional shape of the container 120 in A-A' cross section.

FIG. 6 schematically shows an example of a cross-sectional shape of the container 120 in B-B' cross section.

FIG. 7 schematically shows an example of a cross-sectional shape of the container 120 in C-C' cross section.

FIG. 8 schematically shows an example of the positional relationship between the container 120 and the wire 232.

FIG. 9 schematically shows an example of a transport vehicle 140.

FIG. 10 schematically shows an example of the internal configuration of a control unit 960.

FIG. 11 schematically shows an example of the positional relationship between the transport vehicle 140 and the rack 130.

FIG. 12 schematically shows an example of a storage procedure of the container 120.

FIG. 13 schematically shows an example of a storage procedure of the container 120.

FIG. 14 schematically shows an example of a storage procedure of the container 120.

FIG. 15 schematically shows an example of a storage procedure of the container 120.

FIG. 16 schematically shows an example of a storage procedure of the container 120.

FIG. 17 schematically shows another example of the storage procedure of the container 120.

FIG. 18 schematically shows another example of the storage procedure of the container 120.

FIG. 19 schematically shows another example of the storage procedure of the container 120.

FIG. 20 schematically shows another example of the storage procedure of the container 120.

FIG. 21 schematically shows another example of the storage procedure of the container 120.

FIG. 22 schematically shows another example of the storage procedure of the container 120.

FIG. 23 schematically shows another example of the storage procedure of the container 120.

FIG. 24 schematically shows an example of a procedure for unloading the container 120.

FIG. 25 schematically shows an example of the internal configuration of the control server 160.

FIG. 26 schematically shows another example of the system configuration of the automated warehouse 2600.

DETAILED DESCRIPTION

Hereinafter, the present disclosure will be described through embodiments of the disclosure, but the following embodiments do not limit the scope of claims in the disclosure. Also, not all combinations of features described in the embodiments are essential to the means of solving the invention. In the drawings, the same or similar parts may be given the same reference number to omit duplicate explanations.

In the specification of the present application, the term "one or more" means "one or more than one". The term "upward" includes not only the case where the direction is upward in the vertical direction but also the case where the angle between the direction and the vertical direction is less than 90 degrees. The angle between the direction and the vertical direction may be 60 degrees or less, 45 degrees or less, or 30 degrees or less. The term "downward" includes not only the case where the direction is downward in the vertical direction but also the case where the angle between the direction and the vertical direction is less than 90 degrees. The angle between the direction and the vertical direction may be 60 degrees or less, 45 degrees or less, or 30 degrees or less.

(Overview of Automated Warehouse 100)

An outline of the system configuration of the automated warehouse 100 will be described with reference to FIGS. 1, 2 and 3. FIG. 1 schematically shows an example of the inside of the automated warehouse 100. FIG. 2 schematically shows an example of the system configuration of the automated warehouse 100. FIG. 3 schematically shows an example of a container storage method in the automated warehouse 100.

As shown in FIG. 1, in the present embodiment, the automated warehouse 100 includes one or more containers 120 and one or more racks 130. The automated warehouse may include one or more transport vehicles 140. The automated warehouse 100 may include one or more picking devices 150. The automated warehouse 100 may include a control server 160. As shown in FIGS. 1 and 2, in the present embodiment, the floor 10 of the automated warehouse 100 is arranged on the x-y plane. Further, the wall 20 of the automated warehouse 100 extends from the floor 10 in the z-direction. In the present embodiment, a direction substantially parallel to the z-direction may be referred to as a vertical direction.

In this embodiment, the automated warehouse 100 stores one or more articles. Each of the one or more articles are stored, for example, in a state of being housed in a container 120. Examples of storage of articles include loading, storage, control, and unloading.

More specifically, when articles are loaded into the automated warehouse 100, the articles to be loaded are first stored in the container 120 by the picking device 150. Next, the transport vehicle 140 transports the container 120 to the rack 130 designated by the control server 160. After that, the container 120 is transferred from the transport vehicle 140 to the rack 130. As a result, the articles are loaded from the automated warehouse 100.

When the articles are unloaded from the automated warehouse 100, the control server 160 first specifies the storage location of the container 120 that houses the articles to be unloaded. The control server 160 moves the transport vehicle 140 to the rack 130 in which the container 120 is stored. Next, the container 120 is transferred from the rack 130 to the transport vehicle 140. The transport vehicle 140 transports the container 120 to the picking position of the picking device 150. After that, the article to be carried out is unloaded from the container 120 by the picking device 150. As a result, the articles are carried out from the automated warehouse 100.

According to this embodiment, a plurality of racks 130 are installed in a matrix on the floor 10 of the automated warehouse 100. Each of the plurality of racks 130 is configured to support one or more containers 120. Each of the plurality of racks 130 is configured to support, for example, a plurality of containers 120 stacked in a row.

(Overview of Rack 130)

Each of the plurality of racks 130 is configured so that, for example, when each rack is installed at a predetermined position, some of the plurality of containers 120 stacked in the vertical direction can be supported from the side or the below. For example, as shown in FIG. 3, a plurality of notches 124 are formed on the outer side surface of the container 120. According to the present embodiment, the rack 130 supports the container 120 from below by arranging some of each of the plurality of notches 124 so as to be fitted into a part of the rack 130. As a result, the downward movement of the container 120 is suppressed at the predetermined support position of the rack 130, and the container 120 can be stored in the rack 130.

In one embodiment, the rack 130 is configured to support, from the side or the bottom, a single container 120 contained in a plurality of containers 120 stacked in the vertical direction. In another embodiment, the rack 130 is configured to support, from the side or the bottom, at least two containers 120 contained in a plurality of containers 120 stacked in the vertical direction.

The rack 130 may support the plurality of containers 120 by applying a force to the side surfaces of some of the containers 120. The rack 130 may support the plurality of containers 120 by applying a force to the inner surface or unevenness of the holes arranged on the side surfaces of some of the containers 120. The rack 130 may support the plurality of containers 120 by applying a force to the bottom surfaces of some of the containers 120. The rack 130 may support the plurality of containers 120 by applying a force to the side surfaces and the bottom surface of some of the containers 120.

More specifically, as shown in FIG. 2, the rack 130 includes, for example, a frame 222 and a frame support 224. The rack 130 may include a plurality of frames 222. The rack 130 may include a plurality of frame supports 224. The rack 130 may further include one or more wires 232 and one or more wire supports 234. The rack 130 may have a reinforcing member (not shown) for reinforcing the strength of either the frame 222 or the frame support 224 or both frames.

Further, as shown in FIG. 3, the frame 222 and the frame support 224 are configured so that, for example, when the rack 130 is arranged on the floor 10, a space 322 and a space 324 are formed inside the rack 130. In the present embodiment, one space 322 and four spaces 324 are formed inside the rack 130. Space 322 and spaces 324 may form a part of the transport path of the container 120.

In the present embodiment, the space 322 may be an opening formed by the frame 222 when the frame 222 is virtually moved along a direction substantially perpendicular to the floor 10 from the installation position of the frame 222 to the position of the floor 10, or it may be a region through which the opening formed in the frame 222 passes. The direction substantially perpendicular to the floor 10 may be the vertical direction, or may be the direction inclined from the vertical direction so that the plurality of containers 120 supported by the rack 130 do not fall or collapse due to gravity.

The upper end of the space 322 may be surrounded by the frames 222. The sides of space 322 may be surrounded by spaces 324.

In this embodiment, the shape and size of the space 322 may be determined based on the shape and size of the container 120. The shape and size of the space 322 is determined so that the container 120 can rotate inside the space 322 about a rotation axis substantially perpendicular to the floor 10. The shape and size of the space 322 may be determined so that the angle at which the container 120 can rotate inside the space 322 satisfies a predetermined numerical range. The rotation of the container 120 may be realized by the rotation or turning of the transport vehicle 140. When the transport vehicle 140 has a rotation mechanism that rotates the loading surface on which the container 120 is loaded in a substantially horizontal direction, the rotation of the container 120 may be realized by the operation of the rotation mechanism, or it may be realized by a combination of the operation of the rotation mechanism and the rotation or turning of the transport vehicle 140.

In one embodiment, the shape and size of the space 322 are determined so that, after the transport vehicle 140 loaded with a predetermined number of containers 120 has entered the inside of the space 322, it can rotate or turn around an axis of rotation substantially perpendicular to the floor 10 inside the space 322. In another embodiment, the shape and size of the space 322 are determined so that, for example, after the transport vehicle 140 loaded with a predetermined number of containers 120 enters the inside of the space 322, the rotation mechanism arranged on the transport vehicle 140 can rotate the container 120 loaded on the transport vehicle 140 about a rotation axis substantially perpendicular to the floor 10.

In the present embodiment, the shape and the size of the space 322 may be determined so that the transport vehicle 140 loaded with a predetermined number of containers 120 can pass through the space 322 without colliding with one or more containers 120 supported by the rack 130. The shape and size of the space 322 may be determined so that the container 120 arranged inside the space 322 can move in the vertical direction. For example, the shape and size of the space 322 may be determined so that the container 120 can be lifted from the inside of the space 322 to the outside of the space 322 or dropped from the outside of the space 322 to the inside of the space 322, when either the position or the orientation or both the position and the orientation of the container 120 satisfy a specific condition.

In this embodiment, each of the four spaces 324 may be an area surrounded by floor 10, frames 222, or frame supports 224. Each of the four spaces 324 links the outside of the rack 130 to the space 322.

In the present embodiment, the shape and size of the space 324 are determined so that the transport vehicle 140 loaded with a predetermined number of containers 120 can pass through the space 324. For example, the size of the space 324 is determined so that the transport vehicle 140 loaded with a predetermined number of containers 120 can pass through the space 324 and carry the container 120 from the outside of the rack 130 into the space 322. The size of the space 324 may also be determined so that the transport vehicle 140 loaded with a predetermined number of containers 120 can pass through the space 324 and carry the container 120 from the inside of the space 322 out to the outside of the rack 130.

As a result, the transport vehicle 140 can freely travel below the plurality of racks 130 arranged in a matrix, and transport the container 120 between the first position and the second position. For example, the transport vehicle 242 transports at least one container 120 between the rack 130 and the picking device 150. The transport vehicle 242 may transport at least one container 120 between the first rack 130 and the second rack 130.

(Outline of Storage Method of Container 120)

In the present embodiment, the automated warehouse 100 can store a plurality of containers 120 by stacking them in the vertical direction. The plurality of containers 120 stacked in a row in the vertical direction are supported by, for example, a rack 130 at a predetermined height from the floor 10. As a result, the space below the container 120 supported by the rack 130 can be used as a transport path for another container 120.

In the present embodiment, the automated warehouse 100 may store a plurality of containers 120 supported by the specific rack 130 so that (i) the containers are arranged above the specific rack 130 than the containers 120 stored earlier in the specific rack 130, or (ii) the containers from the specific rack 130 are unloaded first than the container 120 arranged below the specific rack 130. For example, the container 120 newly stored in the specific rack 130 is arranged at the bottom of a plurality of containers 120 stacked in a row in the specific rack 130. Furthermore, the plurality of containers 120 stacked in a row in the specific rack 130 are sequentially unloaded starting from the containers 120 arranged at the bottom.

In the automated warehouse 100, the container 120 may be moved between the plurality of racks 130. Therefore, it should be noted that, in a plurality of containers 120 that are stacked in a row in the vertical direction and stored in a specific rack 130, in terms of time, the container 120 stored earlier in the automated warehouse 100 is not necessarily placed above the container 120 stored in the automated warehouse 100 later in time.

In the present embodiment, either the position or the orientation or both the position and the orientation of the container 120 are adjusted in the step of transferring the container 120 between the rack 130 and the transport vehicle 140. For example, either the relative positional relationship (sometimes referred to as a relative position) between the container 120 and the rack 130 or the angle formed by the reference plane of the container 120 and the reference plane of the rack 130 or both of the relationship and the angle are adjusted. The angle formed by the reference plane of the container 120 and the reference plane of the rack 130 is adjusted by, for example, rotating the container 120 around a rotation axis extending in a substantially vertical direction. The rotation shaft may be arranged inside the container 120 or outside the container 120.

Either the position or the orientation or both the position and the orientation of the container 120 are adjusted by, for example, the operation of the transport vehicle 140. Examples of the operation of the transport vehicle 140 include at least one of the following operations: a movement operation of the transport vehicle 140, a lifting operation of the container 120, and a rotation operation of the container 120.

According to one embodiment, either the position or the orientation or both the position and the orientation of the container 120 are adjusted by the movement of the transport vehicle 140. Examples of the movement of the transport vehicle 140 include translational movement, rotational movement, and turning movement. For example, the relative positions of the container 120 and the rack 130 are adjusted by the translational movement of the transport vehicle 140. Further, the angle formed by the reference surface of the container 120 and the reference surface of the rack 130 is adjusted by the rotational motion or the turning motion of the transport vehicle 140.

According to another embodiment, the transport vehicle 140 has a rotation mechanism that rotates the loading surface on which the container 120 is loaded in a substantially horizontal direction, and either the position or the orientation or both the position and the orientation of the container 120 are adjusted by the operation of the rotation mechanism. The rotation mechanism may be incorporated in a lift unit that moves the loading surface in a substantially vertical direction, or may be arranged under the lifting device, and is located between the lifting device and the loading surface.

According to still another embodiment, either the position or the orientation or both the position and the orientation of the container 120 are adjusted by the movement of the transport vehicle 140 and the operation of the rotation mechanism described above. For example, the relative positions of the container 120 and the rack 130 are adjusted by the translational movement of the transport vehicle 140. Further, the angle formed by the reference surface of the container 120 and the reference surface of the rack 130 is adjusted by the operation of the rotation mechanism described above. The angle formed by the reference plane of the container 120 and the reference plane of the rack 130 may be adjusted by the rotational movement or the turning movement of the transport vehicle 140, and the combination with the operation of the rotation mechanism described above.

As described above, the shape and size of the rack 130 are designed so that the container 120 can move freely in the vertical direction if either the position or the orientation or both the position and the orientation of the container 120 satisfy a specific condition. Therefore, in the process of transporting the container 120, either the position or the orientation or both the position and the orientation of the container 120 are adjusted, so as to switch between (i) a state in which the rack 130 supports the container 120, and the vertical movement of the container 120 is restricted by the rack 130, and (ii) a state in which the rack 130 does not support the container 120, and the vertical movement of the container 120 is not restricted by the rack 130. Details of switching the above states will be described later.

According to the present embodiment, for example, the container 120 is stored in the rack 130 by adjusting the rotation and ascend/descend of the newly stored container 120. Further, the container 120 is unloaded from the rack 130 by adjusting the rotation and ascend/descend of the container 120 that has already been stored. Details of the storage procedure and the removal procedure of the container 120 will be described later.

(Overview of Each Part of Automated Warehouse 100)
(Container 120)

In this embodiment, each of the one or more containers 120 is used to house one or more articles. The material, shape, and size of the container 120 are determined, for example, in consideration of storage efficiency and ease of handling of the article. The shape and size of the container 120 are not particularly limited, but, for example, the container has a width of 20 cm to 1 m, a height of 20 cm to 1 m, and a depth of 20 cm to 1 m. Details of the container 120 will be described later.

(Rack 130)

In this embodiment, each of the one or more racks 130 supports one or more containers 120. For example, the rack 130 supports a plurality of containers 120 stacked in a row.

In one embodiment, the rack 130 supports from below the container 120 located at the bottom of the plurality of containers 120 stacked in a row. Thereby, the rack 130 can support all of the plurality of containers 120 stacked in a row.

In another embodiment, when the lower part of one container 120 and the upper part of the other container 120 are configured to be connectable or detachable, the rack 130 may support from below the container 120 arranged at arbitrary positions, of a plurality of containers 120 stacked in a row. Thereby, the rack 130 can support all of the plurality of containers 120 stacked in a row.

In the above two embodiments, the rack 130 may support, from below, two or more containers 120 that form a part of the plurality of containers 120 stacked in a row. Thereby, the rack 130 can support all of the plurality of containers 120 stacked in a row.

In this embodiment, each of the plurality of racks 130 supports one or more containers 120 at a position above the floor 10. As shown in FIG. 2, for example, the distance H22 between the floor 10 and the bottom surface of the container 120 arranged at the bottom of the one or more containers 120 supported by the rack 130 is larger than the distance H24 between the floor 10 and the upper surface of the container 120 arranged at the top, of at least one container 120 loaded on the transport vehicle 140. As a result, each of the one or more transport vehicles 140 can travel below the plurality of containers supported by the one or more racks 130 with at least one container 120 loaded therein.

(Frame 222)

In the present embodiment, the frame 222 of the rack 130 supports the container 120 at a predetermined position by supporting a part of the outside of the container 120 from below. The frame 222 may support a part of the outer bottom surface of the container 120 from below, or may support a part of the outer side surface of the container 120 from below. The frame 222 may support the container 120 at least two points. The frame 222 may support the container 120 at three points or at four points. The frame 222 may support the container 120 at five or more points.

As described above, the transport vehicle 140 loaded with a predetermined number of containers 120 can move the above-mentioned containers 120 between the outside of the rack 130 and the inside of the space 322 via the space 324. Therefore, in the present embodiment, the frame 222 of the rack 130 is arranged so that the container 120 located at the bottom of one or more containers 120 supported by the rack 130 is located at a position that does not limit the movement of at least one container 120 between the outside of the rack 130 and the space 322.

As a result, the above-mentioned distance H22 becomes larger than the above-mentioned distance H24. Further, with the frame 222 of the rack 130, even when the rack 130 supports the container 120, at least one of one or more transport vehicles 140 loaded with at least one container 120 can travel below the container 120 located at the bottom of one or more containers 120 supported by the rack 130.

In one embodiment, the distance between the frame 222 and the floor 10 is determined so that a transport vehicle 140 loaded with a predetermined first number of containers 120 can travel below one or more containers 120 supported by the rack 130, when the frame 222 supports the container 120 located at the bottom of the one or more containers 120 supported by the rack 130. In another embodiment, the distance between the frame 222 and the floor 10 is determined so that a transport vehicle 140 loaded with a predetermined first number of containers 120 can travel below one or more containers 120 supported by the rack 130, when a predetermined second number of containers 120 is connected below the containers 120 directly supported by the frame 222.

In yet another embodiment, the distance between the frame 222 and the floor 10 may be changed dynamically. For example, an actuator (not shown) arranged on the frame support 224 changes the vertical position of the frame 222. This change prevents the collision between the frame 222 of the rack 130 or the container 120 supported by the rack 130 and the container loaded on the transport vehicle 140.

As described above, in the transfer process of the container 120, by adjusting either the position or the orientation or both the position and the orientation of the container 120, it is possible to switch between (i) a state in which the rack 130 supports the container 120, and the vertical movement of the container 120 is restricted by the rack 130, and (ii) a state in which the rack 130 does not support the container 120, and the vertical movement of the container 120 is not restricted by the rack 130.
According to the present embodiment, in a state where the position and orientation of the frame 222 are fixed by the frame support 224, the transport vehicle 140 adjusts either the position or the orientation or both the position and the orientation of the container 120, thereby switching between (i) a state in which the vertical movement of the container 120 is restricted by the frame 222, and (ii) a state in which the vertical movement of the container 120 is not restricted by the frame 222.

In this embodiment, the frame 222 is arranged at a position that restricts the vertical movement of the container 120 arranged inside the space 322, when the angle formed by the reference surface 126 of the container 120 and the reference surface 226 of the frame support 224 satisfies a predetermined condition. In this case, for example, the container 120 is supported by the rack 130 because the frame 222 becomes an obstacle to the downward movement of the container 120.

Further, the frame 222 is arranged at a position that does not restrict the vertical movement of the container 120 arranged inside the space 322 when the angle formed by the reference surface 126 and the reference surface 226 does not satisfy a predetermined condition. In this case, since the frame 222 does not hinder the vertical movement of the container 120, the container 120 arranged inside the space 322 can freely move in the vertical direction.

The angle formed by the reference plane 126 and the reference plane 226 may be 0 degree or more and 180 degrees or less, of the angle formed by the two normal vectors when the starting point of the normal vector of the reference plane 126 and the starting point of the normal vector of the reference plane 226 are overlapped. The predetermined condition may be a condition in which the angle formed by the reference surface 126 and the reference surface 226 is within a predetermined numerical range. In the above numerical range, only the upper limit value may be determined, only the lower limit value may be determined, or the upper limit value and the lower limit value may be determined.

The above numerical range is determined, for example, based on at least one of the followings: the external shape and size of the container 120, the external shape and size of the rack 130, the target value for either the loading time or the unloading time or both the loading and unloading time of the container 120, the seismic performance target value, the target values for positioning accuracy when the container 120 is stored in the rack 130, and the target value of the degree of effective use of the container 120. Seismic performance may be defined as the magnitude of an earthquake in which the rack 130 can support a predetermined number of containers 120 stacked in the vertical direction without collapsing. Examples of the magnitude of an earthquake include the seismic intensity or maximum acceleration of the earthquake.

The degree of effective use of the container 120 may be determined based on the volume of the storage space of the container 120 (sometimes referred to as Vs) and the volume of the dead space formed inside the storage space (sometimes referred to as Vd). The greater the degree of effective use of the container 120, the smaller the ratio of Vd to Vs. The degree of effective use of the container 120 may be defined as, for example, Vs/(Vs+Vd) or Vs/Vd.

The numerical range may be determined so that the larger the target value for either the loading time or the unloading time or both times, the larger the upper limit of the numerical range. The above numerical range may be determined so that the larger the target value of seismic performance, the larger the lower limit of the above numerical range. The numerical range may be determined so that the larger the target value of the positioning accuracy is, the narrower the width of the numerical range is.

For example, the greater the variation in the diameter of the circumscribed circle of the cross-sectional shape of the container 120 in the stretching direction (sometimes referred to as the axial direction) of the side surface of the container 120, sufficient seismic performance can be secured even if the above angle is small. Further, in a state where the container 120 is supported by the rack 130, the larger the contact area between the container 120 and the rack 130, the better the seismic performance. For example, according to the embodiment shown in FIG. 3, the larger the angle, the larger the contact area between the container 120 and the rack 130 will be.

If the rotation speed of the container 120 is constant, the smaller the angle is, the shorter the loading and unloading time of the container 120 can be. Further, if the target values of the loading time and unloading time of the container 120 are constant, the smaller the angle is, the smaller the rotation speed of the container 120 can be. The smaller the rotation speed of the container 120 is, the more the collapse of the container 120 at the time of loading or unloading of the container 120 can be suppressed.

The axial direction of the container 120 may be a direction substantially perpendicular to the bottom surface of the container 120 or a direction from the bottom surface of the container 120 toward the opening. The axial direction of the container 120 may be the depth direction of the storage space of the container 120, or may be the vertical direction in the state where the container 120 is stored in the rack 130.

The reference surface 126 of the container 120 is preferably a surface that is arranged substantially perpendicular to the floor 10 when the container 120 is stored in the rack 130. The reference surface 126 of the container 120 may be a surface where the normal vector of the reference surface 126 and the angle formed in the vertical direction are about 90 degrees when the container 120 is stored in the rack 130. The reference surface 226 of the rack 130 is preferably a surface that is arranged substantially perpendicular to the floor 10 when the rack 130 is installed on the floor 10. The reference surface 226 of the rack 130 may be a surface where the normal vector of the reference surface 226 and the angle formed in the vertical direction are about 90 degrees when the rack 130 is installed on the floor 10.

As shown in FIG. 3, in this embodiment, the frame 222 has four beam members. In this embodiment, each of the four beam members is supported by two frame supports 224. Each of the four beam members may be arranged so that the extending direction of the beam member and the extending direction of the two frame supports 224 are substantially perpendicular to each other. Further, as described above, each of the four beam members may be arranged at a position where the distance between the lower end of the beam member and the installation surface is larger than the height required for the passage of the transport vehicle 140 loaded with a predetermined number of containers 120.

As shown in FIG. 3, the height HF of the frame 222 or the beam member constituting the frame 222 may be smaller than the height of the notch 124 of the container 120. As a result, a part of each of the plurality of notches 124 can be fitted into the rack 130. This can prevent the container 120 from tipping over or collapsing due to vertical vibration or horizontal vibration.

(Frame Support 224)

In this embodiment, the frame support 224 of the rack 130 is arranged between the frame 222 and the floor 10. The frame support 224 transmits to the floor 10 the load of one or more containers 120 received by the frame 222. The frame support 224 arranges the frame 222 at the predetermined height described above.

As shown in FIG. 3, in this embodiment, the rack 130 has four frame supports 224. Each of the four frame supports 224 may have a columnar shape. Each of the four frame supports 224 may be arranged so that one end is in contact with the floor 10.

The arrangement of the four frame supports 224 is determined, for example, so that the length of the diagonal line of the quadrangle circumscribing the four frame supports 224, on the surface of the floor 10, is larger than the diameter of the first circumscribed circle of the container 120, or the minimum rotation diameter of the transport vehicle 140. Details of the first circumscribed circle and the minimum rotation diameter will be described later.

The arrangement of the four frame supports 224 may be determined so that the length of each side of the quadrangle is smaller than the diameter of the first circumscribed circle of the container 120 or the minimum rotation diameter of the transport vehicle 140. The arrangement of the four frame supports 224 may be determined so that the maximum length of each side of the quadrangle is larger than the width required for the passage of the transport vehicle 140 loaded with the container 120.

The first circumscribed circle of the container 120 may be a circle arranged so that the bottom surface of the container 120 is horizontal with the opening of the container 120 facing up, and circumscribing the cross-sectional shape (sometimes referred to as the first cross-sectional shape) obtained by cutting the outer circumference of the container 120 in a horizontal plane passing through the upper end of the notch 124 of the container 120.

The minimum rotation diameter of the transport vehicle 140 may be the diameter of a circle drawn by the outermost portion of the transport vehicle 140, when the transport vehicle 140 turns by operating the steering wheel to the maximum, or when the transport vehicle 140 rotates on the spot about an axis substantially perpendicular to the floor 10. The surface of the floor 10 may be substantially flat.

(Wire 232)

In this embodiment, the wires 232 of the rack 130 are arranged above the frame 222. The rack 130 may have a plurality of wires 232. The plurality of wires 232 may be arranged above each column or each row of the plurality of racks 130 arranged in a matrix. The plurality of wires 232 may be arranged above some of the plurality of columns or some of the plurality of rows of a plurality of racks 130 arranged in a matrix. One or more wires 232 may be arranged so as to surround above the outer circumference of the plurality of racks 130 arranged in a matrix. This can suppress one or more containers 120 supported by the rack 130 from falling or collapsing.

A plurality of wires 232 having different heights to be installed may be arranged above the same column or row of the plurality of racks 130 arranged in a matrix. This can further prevent the one or more containers 120 supported by the racks 130 from tipping over or collapsing.

(Wire Support 234)

In this embodiment, the wire support 234 of the rack 130 supports one or more wires 232. One or more wires 232 are arranged at a predetermined height of the wire support 234. The rack 130 may have a plurality of wire supports 234. This can prevent one or more containers 120 supported by the rack 130 from tipping over or collapsing.

(Transport Vehicle 140)

In the present embodiment, the transport vehicle 140 transports at least one container 120 between the first position and the second position.

The first position and the second position may be different positions inside the automated warehouse 100. In the present embodiment, the transport vehicle 140 transfers the container 120 to and from the rack 130. In one embodiment, the transport vehicle 140 loads the container 120 into the rack 130. In another embodiment, the transport vehicle 140 unloads the container 120 from the rack 130.

In the present embodiment, the transport vehicle 140 can move the container 120 in the vertical direction. For example, the transport vehicle 140 maintains the container 120 at a relatively low position (sometimes referred to as a traveling position) when traveling under the rack 130. On the other hand, the transport vehicle 140 moves the container 120 up and down when the container 120 is loaded into the rack 130, or the container 120 is unloaded from the rack 130.

As shown in FIG. 2, the transport vehicle 140 may include a transport vehicle 242 for transporting the container 120 between the rack 130 and the picking device 150, and a transport vehicle 244 for transporting the container 120 from the picking device 150 to another place inside or outside the automated warehouse 100. The transport vehicle 242 and the transport vehicle 244 may have the same or different configuration. Details of the transport vehicle 140 will be described later.

(Picking Device 150)

In the present embodiment, the picking device 150 transfers articles between one container 120 and another container 120. In one embodiment, the picking device 150 takes out the articles housed in the container 120 loaded on the transport vehicle 242, and houses these articles in the container 120 loaded on the transport vehicle 244. In another embodiment, the picking device 150 takes out the articles housed in the container 120 loaded on the transport vehicle 244 and stores these articles in the container 120 loaded on the transport vehicle 242.

(Control Server 160)

In the present embodiment, the control server 160 controls the storage status of the articles.

The control server 160 may control each part of the automated warehouse 100. For example, the control server 160 controls the state of each part of the automated warehouse 100. The control server 160 may control the operation of one or more transport vehicles 140. The control server 160 may control the operation of each of one or more racks 130.

The floor 10 may be an example of an installation surface. The automated warehouse 100 may be an example of a storage system. The container 120 may be an example of one or more containers. The container 120 may be an example of at least one container. The container 120 may be an example of a first container, a second container, or a third container. The upper surface of the notch 124 may be part of the first region. The side surface of the notch 124 may be part of a second region. The reference surface 126 may be an example of a reference surface of one or more side members of the container. The rack 130 may be an example of a base. The transport vehicle 140 may be an example of a transport robot. The control server 160 may be an example of the operation control unit.

The frame 222 may be an example of a support portion and a beam member. The frame 222 may be an example of a plurality of supports. Each of the plurality of beam members constituting the frame 222 may be an example of a support portion. The frame support 224 may be an example of a foundation portion and a support column member. The reference plane 226 may be an example of the reference plane of the base. The reference plane 226 may be an example of at least one reference plane of a plurality of foundations. The wire 232 may be an example of a fall prevention member. The wire support 234 may be an example of a fall prevention member. The transport vehicle 242 may be an example of a transport robot. The transport vehicle 244 may be an example of a transport robot. Space 322 may be an example of a lifting space.

In the present embodiment, the details of the frame 222 have been described by taking the case where the frame 222 is composed of four beam members as an example. However, the frame 222 is not limited to this embodiment. In another embodiment, the frame 222 may be a plate-like member having an opening.

In the present embodiment, the details of the rack 130 have been described by taking as an example the case where the external shape of each beam member constituting the frame 222 is a square columnar shape.
However, the external shape of the beam member is not limited to the square columnar shape. In another embodiment, the external shape of the beam member may be a columnar shape having any cross-sectional shape. The cross-sectional shape of the beam member may be formed by a straight line, or at least a part of the cross-sectional shape of the beam member may include a curved line. When the cross-sectional shape of the beam member is a polygon, all the internal angles of the polygon may be substantially right angles, or at least a part of the internal angles of the polygon may be acute. When the cross-sectional shape of the beam member is a polygon, and all the internal angles of the polygon are substantially right angles, for example, a step is formed on the upper surface of the frame 222. For example, when the cross-sectional shape of the beam member is L-shaped, a step is formed on the upper surface of the frame 222. When the cross-sectional shape of the beam member is a polygon, and at least a part of the internal angles of the polygon is an acute angle, for example, a slope is formed on the upper surface of the frame 222.

In the present embodiment, the details of the rack 130 have been described by exemplifying a case where the frame 222 is fitted into the notch 124 of the container 120 to support the frame 222 the container 120 from below. However, the rack 130 is not limited to this embodiment. In another embodiment, the frame 222 may support, from below, a protrusion protruding outward the container 120 from the side surface of the container 120. The protrusion may be arranged near the upper end of the container 120, near the lower end of the container 120, or in the middle portion between the upper end and the lower end of the container 120. Of the surfaces forming the notch 124, the surface that comes into contact with the frame 222 may be the example of the protruding portion described above.

In the present embodiment, the details of the rack 130 have been described by exemplifying the case where the frame 222 supports the container 120 from below. However, the rack 130 is not limited to this embodiment. In another embodiment, when the angle formed by the reference surface 126 of the container 120 and the reference surface 226 of the frame support 224 satisfies a predetermined condition, the rack 130 supports the container 120 by allowing at least a part of one or a plurality of convex portions arranged on the outer circumference of the container 120 to enter into the concave portions formed in each of the two or more frame supports 224, and the concave portions of the frame support 224 to support, from below, the convex portions of the container 120. In this case, the rack 130 may or may not have a frame 222 that functions as a beam member.

In the present embodiment, the details of the transport path of the container 120 have been described by taking as an example a case where the transport path of the container 120 is formed in a grid shape under a plurality of racks 130 arranged in a matrix. However, the shape of the transport path of the container 120 is not limited to this embodiment. In another embodiment, a line-shaped transport path may be formed under the plurality of racks 130 arranged in a row, or a transport path in a shape of a plurality of lines may be formed under the plurality of racks 130 arranged in a matrix.
(Specific Configuration of Each Part of the Automated Warehouse 100)

Each part of the automated warehouse 100 may be realized by hardware, software, or hardware and software. At least a part of each part of the automated warehouse 100 may be realized by a single server or a plurality of servers. At least a part of each part of the automated warehouse 100 may be realized on a virtual server or a cloud system.

At least a part of each part of the automated warehouse 100 may be realized by a personal computer or a mobile terminal. Examples of mobile terminals include mobile phones, smartphones, PDAs, tablets, notebook computers, or laptop computers, wearable computers, and the like. Each part of the automated warehouse 100 may store information by using a distributed network or a distributed ledger technology such as a Blockchain.

When at least a part of the components constituting the automated warehouse 100 is realized by software, the components realized by the software may be realized by starting a program that defines the operation related to the components in an information processing device having a general configuration.
The information processing device with the above general configuration may be equipped with (i) a data processing device having a processor such as a CPU or GPU, a ROM, a RAM, a communication interface, or the like; (ii) an input device such as a keyboard, pointing device, touch panel, camera, voice input device, gesture input device, various sensors, GPS receivers, etc., (iii) an output device such as a display device, audio output device, and vibration device, and (iv) a storage device (including an external storage device) such as memory, HDD, and SSD.

In the information processing device having the general configuration described above, the data processing device or the storage device may store the program. The above program is executed by the processor to allow the information processing device to execute the operation specified by the program. The program may be stored on a non-transitory computer-readable recording medium. The program may be stored in a computer-readable medium such as a CD-ROM, a DVD-ROM, a memory, or a hard disk, or may be stored in a storage device connected to a network.

The program may be a program for operating the computer as the automated warehouse 100 or a part thereof. The program may include a module that defines the operation of each part of the automated warehouse 100. These programs or modules work on a data processing device, an input device, an output device, a storage device, etc. to make the computer function as each part of the automated warehouse 100, or allow the computer to execute an information processing method in each part of the automated warehouse 100.

The program may be installed on a computer that constitutes at least a portion of the automated warehouse 100 from a computer-readable medium or a storage device connected to a network. By executing the program, the computer may function as at least a part of each part of the automated warehouse 100. The information processing described in the program functions as a concrete means to integrate the software related to the program with the automated warehouse 100 or a part of various hardware resources, by allowing the computer to read the program.

Then, the specific means described above calculates or processes the information according to the purpose of use of the computer in the present embodiment, so as to construct the automated warehouse 100 according to the purpose of use.

The program may be a program for allowing a computer to execute an information processing method in the automated warehouse 100 or a part thereof. The above information processing method may be a method of controlling the operation of the rack 130. The information processing method may be a method of adjusting the position where the frame 222 of the rack 130 is installed. The information processing method may be a method for controlling the operation of the transport vehicle 140. The information processing method may be a method for the transport vehicle 140 to load a container 120 into the rack 130. The information processing method may be a method for the transport vehicle 140 to unload the container 120 from the rack 130. The information processing method may be a method for the control server 160 to control either the rack 130 or the transport vehicle 140 or both.

The information processing method may be a control method for controlling the operation of a transport robot equipped with a load unit that can load at least one of the containers, a lift unit for moving the load unit in the vertical direction, and a moving unit for moving the transport robot. The control method has, for example, a procedure in which the moving unit moves the transport robot to transport the container into the lifting space of the base. The control method has a procedure, for example, for the moving unit to move the transport robot to adjust the position of the container so that the angle between the reference surface of the container and the reference surface of the base does not satisfy a predetermined condition. The control method has a procedure, for example, for the lift unit to move the load unit upward so that the lower end of the first region of the container is arranged above the upper ends of the plurality of supports of the base. The above control method has a procedure, for example, for the moving unit to move the transport robot to adjust the position of the container so that the angle formed by the reference surface of the container and the reference surface of the base satisfies a predetermined condition.

The control method may include a procedure in which the moving unit moves the transport robot inside the lifting space of the base. It may include a procedure in which the moving unit moves the transport robot to adjust the position of the load unit or the container located at the top of at least one container loaded on the load unit to a specific position below the container supported by the base.

It may include a procedure in which the lift unit moves the load unit upward so that the load unit or the container located at the top of at least one container loaded on the load unit supports the container supported by the base. It may include a procedure in which the moving unit moves the transport robot to adjust the position of the container so that the angle formed by the reference surface of the first container and the reference surface of the base does not satisfy a predetermined condition. It may include a procedure in which the lift unit moves the load unit downward so that the upper end of the first region of the container supported by the base is located below the lower ends of the plurality of supports of the base.

The details of the container 120 according to the embodiment will be described with reference to FIGS. 4, 5, 6, 7, and 8. Further, the relationship between the external shape of the container 120 and the external shape of the rack 130 will be described with reference to FIGS. 6, 7 and 8.

FIG. 4 schematically shows an example of the container 120. FIG. 5 schematically shows an example of the cross-sectional shape of the container 120 in the A-A' cross section. FIG. 6 schematically shows an example of the cross-sectional shape of the container 120 in the B-B' cross section. FIG. 7 schematically shows an example of the cross-sectional shape of the container 120 in the C-C' cross section. FIG. 8 schematically shows an example of the positional relationship between the container 120 and the wire 232.

As shown in FIG. 4, in the present embodiment, the container 120 includes a bottom plate 422, side walls 424, and a cover 430. This forms a storage space 440 in which articles are stored inside the container 120. Further, in the present embodiment, a plurality of notches 124 are arranged on the outside of the side walls 424. A part of the side wall 424 is used as a reference surface 126 of the container 120.

In this embodiment, the bottom plate 422 closes the opening formed at one end of the side wall 424. A part of the bottom plate 422 may form a part of the side surface of the container 120. In this embodiment, at least some part of the side wall 424 has a hollow columnar shape.

The side wall 424 is arranged so as to extend toward one side of the bottom plate 422. The extending direction of the side wall 424 (sometimes referred to as the axial direction) may be substantially parallel to the normal direction of the plane arranged on at least a part of the bottom plate 422.

In this embodiment, the cover 430 constitutes the outer shape of the notch 124. In the present embodiment, the cover 430 is arranged so as to project from the inner surface of the side wall 424 toward the inside of the container 120. In the present embodiment, the cover 430 has, for example, a member forming the upper surface of the notch portion 124, a member forming the lower surface of the notch portion 124, and a member forming the side surfaces of the notch portion 124. Each of the member forming the upper surface of the notch portion 124, the member forming the lower surface of the notch portion 124, and the members forming the side surface of the notch portion 124 may be a flat member or a curved member, or a combination of a flat member and a curved member.

The shape of the member forming the upper surface of the notch portion 124 may be configured to match the shape of the upper surface of the frame 222. For example, when the upper surface of the frame 222 is flat, the member forming the upper surface of the notch 124 may be a flat plate. When either a convex portion or a concave portion or both are arranged on the upper surface of the frame 222, the member constituting the upper surface of the notch portion 124 may have either a concave portion corresponding to the convex portion of the frame 222 or a convex portion corresponding to the concave portion of the frame 222 or both.

As shown in FIG. 5, in the present embodiment, the lower end 512 of the side wall 424 is in contact with the bottom plate 422. The upper end 514 of the side wall 424 constitutes the opening of the container 120. In the present embodiment, the convex portion 522 is arranged on the outside of the bottom plate 422. The shape and size of the convex portion 522 may be determined based on the shape and size of the opening of the container 120.

For example, the size of the convex portion 522 is smaller than the size of the opening of the container 120. In this case, the distance WL from the outer edge of the bottom surface of the container 120 to the convex portion 522 at the lower end of the container 120 is smaller than the distance WU from the outer edge of the side surface of the container 120 to the opening at the upper end of the container 120.

As a result, when the two containers 120 are stacked one above the other, the convex portion 522 of the upper container 120 is fitted into the opening of the lower container 120. This prevents the container 120 from tipping over or collapsing.

In this embodiment, the side wall 424 has a region 542, region 544, and region 546 along the axial direction of the side wall 424. Each of the region 542, the region 544, and the region 546 may be a region extending in the axial direction of the side wall 424. The region 542 is arranged adjacent to the region 544. Region 544 is located adjacent to Region 542 and Region 546. In the present embodiment, the region 542 is arranged at a position closer to the bottom plate 422 than the region 544. The region 546 is arranged at a position farther from the bottom plate 422 than the region 544.

In the present embodiment, the notch 124 is formed in the region 544. The area 544 is formed with a surface 552 in contact with the rack 130 when the container 120 is supported by the rack 130. As a result, the rack 130 can hold the container 120 at a predetermined height by supporting the surface 552 of the container 120 from below.

The height HD of the region 544 (sometimes referred to as the height of the notch 124) may be greater than the height HF of the frame 222 shown in FIG. 3. As a result, a part of each of the plurality of notches 124 can be fitted into the rack 130. This prevents the container 120 from tipping over or collapsing due to vertical vibration or horizontal vibration.

FIG. 6 may be an example of a cross-sectional view when the region 546 of the side wall 424 was cut in a plane substantially perpendicular to the axial direction of the side wall 424. FIG. 6 shows the cross-sectional shape of the side wall 424 in the region 546 together with the rack 130. FIG. 6 shows the relationship between the outer shape of the container 120 and the outer shape of the rack 130, in a state in which the angle formed by the reference surface 126 of the container 120 and the reference surface 226 of the rack 130 is outside the predetermined numerical range, and the rack 130 does not restrict the vertical movement of the container 120. In the present embodiment, the cross-sectional shape of the side wall 424 in the region 542 has the same shape as the cross-sectional shape of the side wall 424 in the region 546.

As shown in FIG. 6, according to the present embodiment, an opening is formed by the inner surface of the frame 222. In the present embodiment, the opening of the frame 222 has a rectangular cross-sectional shape in which the length of the long side represented by LX and the length of the short side represented by LY.

In the present embodiment, for the purpose of simplifying the explanation, the relationship between the container 120 and the rack 130 will be described by taking as an example the case where the cross-sectional shape of the opening of the frame 222 is rectangular. However, the cross-sectional shape of the opening is not limited to this embodiment. In other embodiments, the cross-sectional shape of the opening may be a square, a polygon other than a quadrangle, or a curved shape. The long side of the quadrangle may be an example of the longest side of the polygon.

As shown in FIG. 6, in the present embodiment, the container 120 is arranged at a position where the entire container 120 fits inside the opening of the frame 222. For example, the container 120 is arranged at a position where the center 602 of the circumscribed circle 600 coincides with the center of the opening of the frame 222. The center of the opening of the frame 222 may be the center of the circumscribed circle or the inscribed circle of the cross-sectional shape of the opening of the frame 222. Further, a gap GX may be formed between the container 120 and the short side of the opening of the frame 222. A gap GY may be formed between the container 120 and the long side of the opening of the frame 222.

As shown in FIG. 6, the diameter of the circumscribed circle 600 having a cross-sectional shape in the region 546 of the side wall 424 is larger than the length LX of the long side of the opening of the frame 222. As a result, by rotating the container 120 around a rotation axis extending in a substantially vertical direction, it is possible to switch between a state in which the rack 130 restricts the vertical movement of the container 120, and a state in which the rack 130 does restrict the vertical movement of the container 120.

FIG. 7 may be an example of a cross-sectional view when the region 544 of the side wall 424 was cut in a plane substantially perpendicular to the axial direction of the side wall 424.

FIG. 7 shows the cross-sectional shape of the side wall 424 in the region 544 together with the rack 130. FIG. 7 shows the relationship between the outer shape of the container 120 and the outer shape of the rack 130, in a state in which the angle formed by the reference surface 126 of the container 120 and the reference surface 226 of the rack 130 is within a predetermined numerical range, and a state in which the rack 130 restricts the vertical movement of the container 120. FIG. 7 shows a state in which the container 120 is rotated counterclockwise by about 15 degrees in FIG. 6.

As described above, notches 124 are formed at the four corners of the container 120 in the region 544 of the side wall 424. Therefore, the diameter of the circumscribed circle 700 having a cross-sectional shape in the region 544 of the side wall 424 is smaller than the diameter of the circumscribed circle 600. Thereby, when the area 544 of the container 120 is located inside the opening of the frame 222, the angle at which the container 120 can rotate is greater than the angle at which the container 120 can rotate when the area 542 or the area 546 of the container 120 is located inside the opening of the frame 222.

As described above, the diameter of the circumscribed circle 600 is larger than the length LX of the long side of the opening of the frame 222. Therefore, by rotating the container 120 with the region 544 of the side wall 424 located inside the opening of the frame 222, the upper surface of the notch 124 (that is, the lower end of the region 546) can be moved above the frame 222. As a result, by rotating the container 120 around a rotation axis extending in a substantially vertical direction, it is possible to switch between a state in which the rack 130 restricts the vertical movement of the container 120, and a state in which the rack 130 does not restrict the vertical movement of the container 120.

The center 602 of the circumscribed circle 600 and the center 702 of the circumscribed circle 700 may be arranged at different positions on the extension axis of the side wall 424. The diameter of the circumscribed circle 700 may be larger than, equal to, or smaller than the length LX of the long side of the opening of the frame 222. The diameter of the circumscribed circle 700 may be larger than the length LY of the short side of the opening of the frame 222, may be equal to the length LY of the long side, or may be smaller than the length LY of the long side of the same.

A gap GX' may be formed between the side surface of the notch 124 and the short side of the opening of the frame 222. A gap GY' may be formed between the side surface of the notch 124 and the long side of the opening of the frame 222.

As shown in FIG. 8, according to the present embodiment, each of the plurality of racks 130 arranged in a line or matrix supports a plurality of containers 120 stacked in a row in the vertical direction. In this case, a gap is formed by each of the notches 124 of the two containers 120 held at substantially the same height from the two adjacent racks 130. According to this embodiment, the wire 232 is arranged in the gap described above. This prevents the container 120 from tipping over or collapsing.

The bottom plate 422 may be an example of a bottom member. The side wall 424 may be an example of a side surface member. Region 542 may be an example of a first region. The cross-sectional shape of the region 542 of the side wall 424 may be an example of the first cross-sectional shape. Region 544 may be an example of a second region. The cross-sectional shape of the region 544 of the side wall 424 may be an example of the second cross-sectional shape. Region 546 may be an example of a first region. The cross-sectional shape of the region 546 of the side wall 424 may be an example of the first cross-sectional shape. The circumscribed circle 600 may be an example of the first circumscribed circle. The circumscribed circle 700 may be an example of the second circumscribed circle.

In the present embodiment, the details of the container 120 have been described by exemplifying a case where the convex portion 522 is arranged at the lower part of the container 120 so that the container 120 can be prevented from tipping over or collapsing. However, the container 120 is not limited to this embodiment. As another example of the container 120, each of the plurality of containers 120 may have a member for increasing the connection strength with the other containers 120 stacked in the vertical direction.

In one embodiment, when the two containers 120 are stacked in the vertical direction, the convex portion provided at the lower part of the upper container 120 is fitted into the concave portion provided at the upper part of the lower container 120.

In another embodiment, when the two containers 120 are stacked in the vertical direction, the convex portion provided on the upper portion of the lower container 120 is fitted into the concave portion provided on the lower portion of the upper container 120. Examples of the methods of fitting described above include a method of moving at least one container 120 in the axial direction, a method of sliding at least one container 120 in a substantially horizontal direction, a method of rotating at least one container 120 in a substantially horizontal direction, and the like.

In yet another embodiment, members are arranged below the upper container 120 and above the lower container 120 to improve the shear strength and tensile strength of the two connected containers 120. Examples of the member for improving the shear strength and the tensile strength include a magnetic force generating material, a surface tape, and an adhesive. Examples of the magnetic force generating material include a magnet and a combination of a magnet, a combination of a magnet and iron, and the like. For example, a magnet piece is arranged at the lower part of the upper container 120, and an iron piece is arranged at the upper part of the lower container 120.

FIG. 9 schematically shows an example of the transport vehicle 140. In the present embodiment, the transport vehicle 140 includes a lifting table 902, a lifting device 904, and a vehicle main body 906. In the present embodiment, a concave portion 920 is formed in the lifting table 902. In this embodiment, the lifting device 904 includes a pantograph 942 and an actuator 944. In the present embodiment, the vehicle body 906 includes a control unit 960, a sense unit 962, a communication unit 964, and a power supply 966. The vehicle body 906 may have wheels 980, drive wheels 982, and motor 984.

In the present embodiment, the lifting table 902 can load at least one container 120. In the present embodiment, the lifting device 904 moves the lifting table 902 in the vertical direction. In this embodiment, the vehicle body 906 moves from one position to another. The vehicle body 906 may move to a position designated by the control server 160.

In the present embodiment, the concave portion 920 is arranged on the loading surface on which the container 120 is loaded and is used for positioning the container 120.

The shape and size of the concave portion 920 are determined based on the shape and size of the bottom of the container 120. The shape and size of the concave portion 920 may be configured to match the shape and size of the bottom of the container 120.

For example, the size of the concave portion 920 is larger than the size of the convex portion 522 of the container 120. The shape and size of the concave portion 920 may be substantially the same as the shape and size of the opening of the container 120. As a result, when the container 120 is loaded on the lifting table 902, the convex portion 522 of the container 120 is fitted into the concave portion 920 of the lifting table 902. This suppresses fluctuations in the loading position of the container 120 in the transport step, the storage step, or the unloading step of the container 120.

In this embodiment, the pantograph 942 supports a lifting table 902. The actuator 944 drives the pantograph 942 to raise or lower the lifting table 902.

In the present embodiment, the control unit 960 controls the operation of the transport vehicle 140. For example, the control unit 960 controls the transport of the container 120 by the transport vehicle 140. The control unit 960 may control the adjustment of either the position or orientation or both the position and the orientation of the container 120 by the transport vehicle 140. The control unit 960 may control the ascent and descent of the container 120 by the transport vehicle 140.

In the present embodiment, the control unit 960 controls each unit of the transport vehicle 140 to store the specific container 120 in the specific rack 130. The control unit 960 may control each part of the transport vehicle 140 to unload the specific container 120 from the specific rack 130. Details of the control unit 960 will be described later.

In the present embodiment, the sense unit 962 includes various sensors. The sense unit 962 may include a position sensor for acquiring information indicating the position of the transport vehicle 140. The sense unit 962 may include a load sensor for detecting the load applied to the lifting table 902. The sense unit 962 may include a lifting amount sensor for detecting the amount of movement of the lifting table 902.

The position sensors include (i) a distance measuring sensor that measures the distance to the wall 20 of the automated warehouse 100, and (ii) a sensor for acquiring information given to a specific position on the floor 10 and information indicating the position. The sensor may be a camera, a magnetic sensor, or a beacon receiver.

In the present embodiment, the communication unit 964 sends and receives information to and from at least one of the rack 130, the other transport vehicle 140, the picking device 150, and the control server 160. When the container 120 includes a communication device, the communication unit 964 may send or receive information to or from the container 120. The communication method between the communication unit 964 and other devices is not particularly limited.

In the present embodiment, the power source 966 supplies electric power to each part of the transport vehicle 140. The power source 966 may include either a power generation device or a power storage device or both.

In this embodiment, the wheels 980 and the drive wheels 982 support the transport vehicle 140. The motor 984 drives the drive wheels 982 to move the transport vehicle 140. The motor 984 may drive each of the left and right drive wheels 982 independently. As a result, the transport vehicle 140 can rotate or turn on the spot.

The lifting table 902 may be an example of a load unit. The lifting device 904 may be an example of a lifting unit. The vehicle body 906 may be an example of a moving unit, a switch unit, and a control device. The control unit 960 may be an example of a switch unit and a control device. The motor 984 may be an example of a moving unit.

FIG. 10 schematically shows an example of the internal configuration of the control unit 960. In the present embodiment, the control unit 960 includes a communication control unit 1020, a travel control unit 1030, and a lifting device control unit 1040.

In the present embodiment, the communication control unit 1020 controls communication between the transport vehicle 140 and an external device. The communication control unit 1020 may control the operation of the communication unit 964.

In the present embodiment, the traveling control unit 1030 controls the movement of the transport vehicle 140. For example, the travel control unit 1030 acquires the information output by the position sensor included in the sense unit 962. The travel control unit 1030 estimates the position of the transport vehicle 140 based on the information output by the position sensor. The travel control unit 1030 controls the motor 984 based on the estimated position of the transport vehicle 140 to move the transport vehicle 140 to a destination. The travel control unit 1030 may control the motor 984 to rotate or turn the transport vehicle 140 on the spot.

In the present embodiment, the lifting device control unit 1040 controls the operation of the lifting device 904. For example, the elevating device control unit 1040 controls the lifting device 904 to move the lifting table 902 upward or downward while the rack 130 does not restrict the vertical movement of the container 120.

In the present embodiment, the details of the transport vehicle 140 have been described by taking as an example a case where the orientation of the container 120 loaded on the transport vehicle 140 is adjusted by rotating or turning the vehicle body 906 on the spot. However, the transport vehicle 140 is not limited to this embodiment. In another embodiment, the lifting table 902 or the vehicle body 906 may have a rotating mechanism for adjusting the orientation of the container 120 loaded on the transport vehicle 140. In this case, the control unit 960 may control the operation of the rotation mechanism to adjust the orientation of the container 120.

FIG. 11 schematically shows an example of the positional relationship between the transport vehicle 140 and the rack 130. As shown in FIG. 11, in the present embodiment, the length of the diagonal line of the quadrangle circumscribing the four frame supports 224 is larger than the minimum rotation diameter of the transport vehicle 140. As described above, the minimum rotation diameter of the transport vehicle 140 may be the diameter of the circle 1100 drawn by the outermost portion of the transport vehicle 140, when the transport vehicle 140 turns by operating the steering wheel to the maximum, or when the transport vehicle 140 rotates on the spot about an axis substantially perpendicular to the floor 10.

When the length of the diagonal line of the quadrangle circumscribing the four frame supports 224 is larger than the minimum rotation diameter of the transport vehicle 140, a gap GV is formed between the circle 1100 and the frame support 224. As a result, when the transport vehicle 140 rotates the container 120 inside the space 322 formed by the rack 130, it is possible to prevent a part of the transport vehicle 140 from colliding with the frame support 224.

When the cross-sectional shape of the four frame supports 224 is polygonal, the quadrangle may be the smallest quadrangle of the quadrangles formed by connecting the corners of the four frame supports 224. The shape of the quadrangle may be a rectangle or a square. It is preferable that the difference between the length SX of the long side of the quadrangle and the length SY of the short side of the quadrangle is small. The arrangement of the frame support 224 may be determined so that the difference between the lengths SX and SY described above is smaller than a predetermined value.

In the present embodiment, the length SX of the long side of the quadrangle is smaller than the minimum rotation diameter of the transport vehicle 140. Similarly, the length SY of the short side of the quadrangle is smaller than the minimum rotation diameter of the transport vehicle 140. Further, the length SX of the long side of the quadrangle is larger than the width required for the passage of the transport vehicle 140 loaded with the container 120. The length SY of the short side of the quadrangle may be larger than the width required for the passage of the transport vehicle 140 loaded with the container 120, or may be smaller than that width.

The length of the diagonal line of the quadrangle may be larger than the diameter of the circumscribed circle 600. The length SX of the long side of the quadrangle may be smaller than the diameter of the circumscribed circle 600. Similarly, the length SY of the short side of the quadrangle may be smaller than the diameter of the circumscribed circle 600.

Further, the container 120 may be loaded on the transport vehicle 140 so that the center 602 of the circumscribed circle 600 and the center 702 of the circumscribed circle 700 substantially coincide with the center 1102 of the circle 1100. The installation positions of the wheels 980 and the drive wheels 982 on the vehicle body 906 may be determined so that the wheels 980 and the drive wheels 982 fit inside the circle 1100.

In the present embodiment, the details of the positional relationship between the transport vehicle 140 and the rack 130 have been explained, taking as an example, a case of four frame supports 224 being arranged around a space for storing containers 120 stacked in a row (sometimes referred to as a storage space). However, the structure of the rack 130 is not limited to this embodiment.

In other embodiments, the number of frame supports 224 arranged around the storage space may be zero, one, two, or three, or five or more. The external shape of the frame support 224 may be columnar, plate-shaped, or trapezoidal.

For example, instead of the four columnar frame supports 224, two plate or trapezoidal frame supports 224 arranged at opposite positions form a single storage space. Instead of four columnar frame supports 224, one plate-shaped frame support 224 and two columnar frame supports 224 arranged opposite to the plate-shaped frame support 224 forms a single storage space.

Further, the number of storage spaces formed between the pair of frame supports 224 facing each other may be one or two or more. When multiple storage spaces are formed between a pair of frame supports 224 facing one another, the number of frame supports 224 arranged around each storage space becomes smaller than when a single storage is formed between the pair of frame supports 224 facing one another. For example, a plurality of storage spaces are formed between the pair of frame supports 224 by (i) two plate-shaped frame supports 224 arranged at opposite positions, or four columnar frame supports 224 arranged at the four corners of a quadrangle, and (ii) the frames 222 on which a plurality of openings are arranged in a line shape or a matrix shape. In this case as well, the number of frame supports 224 arranged around each storage space is not limited to four.

Even when the number of frame supports 224 arranged around the storage space is other than 4, when the transport vehicle 140 rotates the container 120 inside the space 322 formed by the rack 130, it is possible to prevent a part of the transport vehicle 140 from colliding with the frame support 224 in a similar manner as with the embodiments described in relation to FIG. 11.

Further, those skilled in the art who have read the description of the present application can understand that the transport vehicle 140 and the rack 130 can be designed by the same procedure as that of the embodiment described with reference to FIG. 11.

In the present embodiment, the details of the positional relationship between the transport vehicle 140 and the rack 130 have been described by taking as an example a case where a part of the frame 222 and the frame support 224 is shared between adjacent storage spaces. However, the structure of the rack 130 is not limited to this embodiment. In another embodiment, an independent rack 130 is arranged for each storage space. Even in this case, as in the embodiment described in connection with FIG. 11, when the transport vehicle 140 rotates the container 120 inside the space 322 formed by the rack 130, a portion of the transport vehicle 140 is prevented to collide with the frame support 224. Further, those skilled in the art who have read the description of the present application can understand that the transport vehicle 140 and the rack 130 can be designed by the same procedure as that of the embodiment described with reference to FIG. 11.

In the present embodiment, the details of the positional relationship of the transport vehicle 140 and the rack 130 have been explained using, as an example, the case in which the transport vehicle 140 adjusts the orientation of the container 120 by rotating the container 120 inside the space 322 formed by the rack 130. However, the method of adjusting the orientation of the container 120 is not limited to this embodiment.

In another embodiment, the transport vehicle 140 has a rotation mechanism (not shown) of the container 120, and the transport vehicle 140 controls the operation of the rotation mechanism to adjust the orientation of the container 120. Even in this case, as in the embodiment described in connection with FIG. 11, the transport vehicle 140 rotates the container 120 inside the space 322 formed by the rack 130 to prevent a portion of the transport vehicle 140 to collide with the frame support 224. Further, those skilled in the art who have read the description of the present application can understand that the transport vehicle 140 and the rack 130 can be designed by the same procedure as that of the embodiment described with reference to FIG. 11.

(Control Example in the Storage Process of the Container 120)

Details of the storage procedure of the container 120 in the automated warehouse 100 will be described with reference to FIGS. 12, 13, 14, 15, and 16. FIGS. 12 to 16 show an example of the storage procedure of the container 120 when the rack 130 does not support the container 120 at the time immediately before storing the container 120 subjected for storage.

In the present embodiment, for the purpose of simplifying the description, an example of the storage procedure of the container 120 will be described by taking as an example the case where a single container 120 is stored. However, the storage procedure of the container 120 is not limited to this embodiment. In other embodiments, a plurality of containers 120 may be stored at one time.

According to the present embodiment, first, as shown in FIG. 12, the traveling control unit 1030 controls the motor 984 to move the transport vehicle 140 loaded with the container 120 to a position below the target rack 130. As a result, the container 120 is transported into the space 322 of the target rack 130.

Next, the traveling control unit 1030 controls the motor 984 to finely adjust the position of the transport vehicle 140. Specifically, the travel control unit 1030 adjusts the positions of the container 120 in the x-direction and the y-direction, and the directions of the reference surface 126 of the container 120 in the normal direction. The travel control unit 1030 may adjust the positions of the container 120 in the x-direction and the y-direction and the orientation of the reference surface 126 of the container 120 in the normal direction, in a state in which the rack 130 does not restrict the movement of container 120 in the vertical direction.

For example, the travel control unit 1030 adjusts the positions of the container 120 in the x-direction and the y-direction, so that the center 602 of the circumscribed circle 600 of the container 120 coincides with the center of the circumscribed or inscribed circle of the opening formed by the frame 222 of the rack 130. Further, the traveling control unit 1030 adjusts the orientation of the reference surface 126 of the container 120 in the normal direction, so that the reference surface 126 of the container 120 and the reference surface 226 of the target rack 130 do not satisfy the predetermined conditions.

Next, as shown in FIG. 13, the lifting device control unit 1040 controls the actuator 944 to lift the lifting table 902. The lifting device control unit 1040 may lift the lifting table 902 until the upper surface of the notch 124 of the newly stored container 120 (that is, the lower end of the area 546) is located above the upper surface of the frame 222.

When the upper surface of the notch 124 of the newly stored container 120 is located above the upper surface of the frame 222 and reaches a predetermined position, the lifting device control unit 1040 controls the actuator 944 to stop the ascent of the lifting table 902. At this time, the lower surface of the notch 124 of the container 120 (that is, the lower end of the region 544) is located below the lower surface of the frame 222.

Next, as shown in FIG. 14, the traveling control unit 1030 controls the motor 984 to rotate or turn the transport vehicle 140 on the spot. As a result, the container 120 rotates about an axis substantially perpendicular to the floor 10. The travel control unit 1030 may control the motor 984 so that the container 120 rotates about the center 602 of the circumscribed circle 600 or the center 702 of the 7000.

The travel control unit 1030 rotates or turns the transport vehicle 140 until the state in which the rack 130 restricts the vertical movement of the container 120. Specifically, the orientation of the reference surface 126 of the container 120 in the normal direction is adjusted so that the reference surface 126 of the container 120 and the reference surface 226 of the target rack 130 satisfy predetermined conditions. As a result, the states of the container 120 and the rack 130 are switched from the state in which the rack 130 does not restrict the vertical movement of the container 120 to the state in which the rack 130 restricts the vertical movement of the container 120.

Next, as shown in FIG. 15, the lifting device control unit 1040 controls the actuator 944 to lower the lifting table 902. As a result, the upper surface of the notch 124 of the container 120 comes into contact with the upper surface of the frame 222, and the frame 222 supports the container 120 from below. As a result, the container 120 to be stored is stored in the rack 130.

After that, as shown in FIG. 16, the lifting device control unit 1040 controls the actuator 944 to lower the lifting table 902 to the traveling position. Further, the traveling control unit 1030 controls the motor 984 to rotate or turn the transport vehicle 140 on the spot. As a result, the transport vehicle 140 can move from the inside of the space 322 of the rack 130 to the outside of the rack 130 through between the two frame supports 224.

The newly stored container 120 may be an example of the second container. The upper surface of the notch 124 may be an example of the lower end of the first region. The upper surface of the frame 222 may be an example of the upper end of the support portion.

(Control Example in the Storage Process of the Container 120)

Another example of the storage procedure of the container 120 in the automated warehouse 100 will be described using FIG. 17, FIG. 18, FIG. 19, FIG. 20, FIG. 21, FIG. 22, and FIG. 23. FIGS. 17 to 23 show an example of the storage procedure of the container 120 when the rack 130 already supports one or more containers 120 at the time immediately before the container 120 to be stored is stored.

In the present embodiment, for the purpose of simplifying the explanation, an example of the storage procedure of the container 120 will be described by presenting the case where a single container 120 is stored as an example. However, the storage procedure of the container 120 is not limited to this embodiment. In other embodiments, a plurality of containers 120 may be stored all at once.

According to the present embodiment, first, as shown in FIG. 17, the traveling control unit 1030 controls the motor 984 to move the transport vehicle 140 loaded with the container 120 to a position below the target rack 130. As a result, the container 120 is transported into the space 322 of the target rack 130.

Next, as shown in FIG. 18, the traveling control unit 1030 controls the motor 984 to finely adjust the position of the transport vehicle 140. Specifically, the travel control unit 1030 adjusts the positions of the container 120 in the x-direction and the y-direction and the orientation of the reference surface 126 of the container 120 in the normal direction. The travel control unit 1030 may adjust the positions of the newly stored container 120 in the x-direction and the y-direction, and the orientation of the reference surface 126 in the normal direction, so that the position and orientation of the container 120 (sometimes referred to as container A) located at the bottom of one or more containers 120 already supported by the rack 130 match the position and orientation of the newly stored container 120.

One or more containers 120 already supported by the rack 130 are stored in the rack 130, with the orientation of the reference plane 126 adjusted, so that the angle formed by the reference surface 126 of the container 120 and the reference surface 226 of the frame support 224 satisfies a predetermined condition. Therefore, the traveling control unit 1030 controls the motor 984 to adjust the positions of the container 120 in the x-direction and the y-direction, so that the center 602 of the circumscribed circle 600 of the container A is aligned with the center 602 of the circumscribed circle 600 of the newly stored container 120 (sometimes referred to as the container B). Further, the traveling control unit 1030 controls the motor 984 to adjust the orientation of the reference surface 126 of the container B in the normal direction, so that the angle between the reference surface 126 of the container B and the reference surface 226 of the rack 130 satisfies a predetermined condition. As a result, the position of the container B is adjusted to the container A.

Next, as shown in FIG. 19, the lifting device control unit 1040 controls the actuator 944 to lift the lifting table 902. The lifting device control unit 1040 may lift the lifting table 902 until the upper end of the container B reaches a position supporting the lower end of the container A. As a result, the container B is arranged at the bottom of one or more containers 120 already supported by the rack 130.

At a position where the upper end of the container B supports the lower end of the container A, the upper surface of the notch 124 of the container A may or may not be in contact with the upper surface of the frame 222.

At a position where the upper end of the container B supports the lower end of the container A, it is preferable that the upper surface of the notch 124 of the container A does not contact the upper surface of the frame 222, and the lower surface of the notch 124 of the container A does not contact the lower surface of the frame 222. When a plurality of containers 120 are loaded on the transport vehicle 140, the lifting device control unit 1040 may raise the lifting table 902 until the upper end of the container 120 located at the uppermost portion of the plurality of containers 120 loaded on the transport vehicle 140 reaches a position supporting the lower end of the container A.

Next, as shown in FIG. 20, the traveling control unit 1030 controls the motor 984 to rotate or turn the transport vehicle 140 on the spot. As a result, the plurality of containers 120 stacked in a row rotate about an axis substantially perpendicular to the floor 10. The travel control unit 1030 may control the motor 984 so that the container 120 rotates about the center 602 of the circumscribed circle 600 or the center 702 of the 7000.

The travel control unit 1030 adjusts the orientation of the reference surface 126 of the container 120 in the normal direction, so that the reference surface 126 of at least one (for example, container B) of the plurality of containers 120 stacked in a row and the reference surface 226 of the target rack 130 do not satisfy the predetermined conditions. As a result, the states of the container 120 and the rack 130 are switched from the state in which the rack 130 restricts the vertical movement of the container 120 to the state in which the rack 130 does not restrict the vertical movement of the container 120.

Next, as shown in FIG. 21, the lifting device control unit 1040 controls the actuator 944 to lift the lifting table 902. The lifting device control unit 1040 may lift the lifting table 902 until the upper surface of the notch 124 (that is, the lower end of the region 546) of the container 120 (for example, the container B) to be newly supported by the rack 130 is located above the upper surface of the frame 222.

When the upper surface of the notch 124 of the container 120 to be newly supported by the rack 130 is located above the upper surface of the frame 222 and reaches a predetermined position, the lifting device control unit 1040 controls the actuator 944 to stop the ascent of the lifting table 902. At this time, the lower surface of the notch 124 of the container 120 (that is, the lower end of the region 544) is located below the lower surface of the frame 222.

Next, as shown in FIG. 22, the traveling control unit 1030 controls the motor 984 to rotate or turn the transport vehicle 140 on the spot. As a result, the plurality of containers 120 stacked in one row rotate about an axis substantially perpendicular to the floor 10. The travel control unit 1030 may control the motor 984 so that the container 120 rotates about the center 602 of the circumscribed circle 600 or the center 702 of the 7000.

The travel control unit 1030 rotates or turns the transport vehicle 140 until it becomes a state in which the rack 130 restricts the vertical movement of the container 120. Specifically, the orientation of the reference plane 126 of the container 120 in the normal direction is adjusted, so that the reference surface 126 of at least one (for example, container B) of a plurality of containers 120 stacked in a row and the reference surface 226 of the target rack 130 satisfy predetermined conditions. As a result, the states of the container 120 and the rack 130 are switched from the state in which the rack 130 does not restrict the vertical movement of the container 120 to the state in which the rack 130 restricts the vertical movement of the container 120.

The traveling control unit 1030 may control the motor 984 so that the direction of rotation or turning of the transport vehicle 140 is opposite to the direction of rotation or turning shown in FIG. 20. Further, the traveling control unit 1030 may control the motor 984 so that the absolute value of the rotation or turning angle of the transport vehicle 140 substantially coincides with the absolute value of the rotation or turning angle shown in FIG. 20.

Next, as shown in FIG. 23, the lifting device control unit 1040 controls the actuator 944 to lower the lifting table 902. This allows the upper surface of the notch 124 of the container 120 to be newly supported by the rack 130 to be in contact with the upper surface of the frame 222, and the frame 222 to support the container 120 from below. As a result, the container 120 to be stored is stored in the rack 130.

After that, the lifting device control unit 1040 controls the actuator 944 to lower the lifting table 902 to the traveling position. Further, the traveling control unit 1030 controls the motor 984 to rotate or turn the transport vehicle 140 on the spot. As a result, the transport vehicle 140 can move from the inside of the space 322 of the rack 130 to the outside of the rack 130 through between the two frame supports 224.

Container A may be an example of the first container. The container B may be an example of the second container. The container 120 to be newly supported may be an example of the second container. The upper surface of the notch 124 may be an example of the lower end of the first region. The upper surface of the frame 222 may be an example of the upper end of the support portion.

(Control Example in the Unloading Process of the Container 120)

FIG. 24 schematically shows an example of a procedure for unloading the container 120. FIG. 24 shows an example of a procedure for unloading a target container 120 from a plurality of containers 120 stacked in a row.

According to the present embodiment, first, in step 2422 (step may be abbreviated as S), the communication unit 964 receives an instruction from the control server 160. The instructions include, for example, at least one piece of (i) information indicating the work type, (ii) identification information of the target rack 130, (iii) position information of the target rack 130, and (iv) identification information on target container 120, (v) location information of the target container 120, (vi) information indicating the availability of other racks 130 located in the vicinity of the target rack 130, and (vii) the destination of the retrieved container 120.

Examples of work types include storage work, unloading work, and transport work. The position information of the rack 130 may include information indicating the coordinates of the stop position of the transport vehicle 140. The position information of the container 120 may include information indicating the vertical position of the target container 120 in one or more containers 120 supported by the target rack 130. The information indicating the position in the vertical direction may be the information indicating the order in which the target container 120 is arranged from the bottom.

After that, the traveling control unit 1030 controls the motor 984 to move the transport vehicle 140 to a position below the target rack 130. Further, the traveling control unit 1030 controls the motor 984 to adjust the position of the transport vehicle 140.

Next, in S2424, the lifting device control unit 1040 determines whether or not the container 120 located at the bottom of the one or more containers 120 supported by the target rack 130 is the target container 120. When the [container] 120 located at the lowermost part is not the target container 120 (No in S2424), in S2432, the traveling control unit 1030 works in concert with the lifting device control unit 1040 to unload one or more containers 120 existing below the target container 120, of the one or more containers 120s supported by the target rack 13. The lifting device control unit 1040 may unload a plurality of containers 120 all at once, or may unload one container 120 at a time.

Next, the traveling control unit 1030 controls the motor 984 to move the transport vehicle 140 below the other rack 130. Further, the traveling control unit 1030 controls the motor 984 to adjust the position of the transport vehicle 140.

Next, the traveling control unit 1030 works in concert with the lifting device control unit 1040 to store the unloaded [container] 120 in another rack 130. After that, the processes of S2422 and S2424 are repeated.

On the other hand, when the [container] 120 located at the lowermost part is the target container 120 (when Yes of S2424), in S2434, the traveling control unit 1030 works in concert with the lifting device control unit 1040 to unload the target container 120. The lifting device control unit 1040 may unload a plurality of containers 120 all at once, or may unload one container 120 at a time.

After that, the traveling control unit 1030 controls the motor 984 to transport the unloaded container 120 to a designated position. This completes the unloading work.

(Control Example in the Unloading Process of S2432)

In the present embodiment, for the purpose of simplifying the explanation, an example of the procedure for unloading the container 120 in S2432 is taken as an example in which the transport vehicle 140 not loaded with the container 120 unloads one container 120 at a time. However, the procedure for unloading the container 120 is not limited to this embodiment. In another embodiment, the transport vehicle 140 may unload a plurality of containers 120 all at once. In yet another embodiment, the transport vehicle 140 loaded with at least one other container 120 may unload the target container 120.

Further, for the purpose of simplifying the explanation, in the present embodiment, an example of the procedure for unloading the container 120 in S2432 will be described, as an example of the case where the target rack 130 supports the container P, container Q, container R, and container S immediately before the unloading process is performed. In the present embodiment, the container P, container Q, container R, and container S are stacked in a row in this order.

In the present embodiment, the container P is a container 120 located at the bottom of a plurality of containers 120 supported by the target rack 130. Further, the rack 130 supports a plurality of containers 120 by supporting the container Q from below. The container R is a target container 120. The container S is a container 120 located above the container R, and is a container 120 that is stored in the rack 130 even after the container R is unloaded. The container S may be a container 120 in contact with the container R. The container S may be a container 120 located one above the container R.

In the present embodiment, the details of the unloading process of the container 120 will be described by taking as an example the case where the container P is connected below the container Q. However, the process of unloading the container 120 is not limited to this embodiment.
In another embodiment, the rack 130 may support a plurality of containers 120 by supporting the container P from below.

According to the present embodiment, in S2422, the position of the lifting table 902 is adjusted to a specific position below the target rack 130 or the target container 120. Specifically, the position and orientation of the concave portion 920 are adjusted so as to coincide with the container P.

In the present embodiment, first, the lifting device control unit 1040 controls the actuator 944 to lift the lifting table 902. The lifting device control unit 1040 may lift the lifting table 902 until the concave portion 920 reaches a position where the container P is supported. When the transport vehicle 140 loaded with at least one other container 120 unloads the target container 120, the lifting device control unit 1040 may raise the lifting table 902 until the container 120 located at the top of the other container 120 reaches a position where the container P is supported.

Next, the traveling control unit 1030 controls the motor 984 to rotate or turn the transport vehicle 140 on the spot. As a result, the container P, the container Q, the container R, and the container S rotate about an axis substantially perpendicular to the floor 10. The travel control unit 1030 may control the motor 984 so that the container 120 rotates about the center 602 of the circumscribed circle 600 or the center 702 of the 7000.

The travel control unit 1030 adjusts the orientation of the reference surface 126 of the container 120 in the normal direction, so that the reference surface 126 of at least one (for example, container R) of the plurality of containers 120 stacked in a row and the reference surface 226 of the target rack 130 do not satisfy the predetermined conditions. As a result, the states of the container 120 and the rack 130 are switched from the state in which the rack 130 restricts the vertical movement of the container 120 to the state in which the rack 130 does not restrict the vertical movement of the container 120.

Next, the lifting device control unit 1040 controls the actuator 944 to lower the lifting table 902.
The lifting device control unit 1040 may lower the lifting table 902, until the vertical distance between the upper surface of the notch 124 of the container S (that is, the lower end of the region 546) and the upper surface of the frame 222 is 0 or within a predetermined positive numerical range. A predetermined positive numerical range may be set, so that the upper end of the container area 546 located one below the container S is located below the lower surface of the frame 222, when the vertical distance between the upper surface of the notch 124 of the container S and the upper surface of the frame 222 is within the predetermined positive numerical range.

Next, the traveling control unit 1030 controls the motor 984 to rotate or turn the transport vehicle 140 on the spot. As a result, the container P, the container Q, the container R, and the container S rotate about an axis substantially perpendicular to the floor 10. The travel control unit 1030 may control the motor 984 so that the container 120 rotates about the center 602 of the circumscribed circle 600 or the center 702 of the 7000.

The travel control unit 1030 adjusts the orientation of the reference surface 126 of the container 120 in the normal direction, so that reference surface 126 of at least one of a plurality of containers 120 stacked in a row (for example, container S) and a reference surface 226 of the target rack 130 satisfy predetermined conditions. As a result, the state of the container 120 and the rack 130 is switched from the state in which the rack 130 does not restrict the vertical movement of the container 120 to the state in which the rack 130 restricts the vertical movement of the container 120.

As a result, the rack 130 can support the container S from below and store the container S. On the other hand, the container P, the container Q, and the container R located below the container S are no longer supported by the rack 130.

Next, the lifting device control unit 1040 controls the actuator 944 to lower the lifting table 902 to the traveling position. Further, the traveling control unit 1030 controls the motor 984 to rotate or turn the transport vehicle 140 on the spot.
As a result, the transport vehicle 140 can move from the inside of the space 322 of the rack 130 to the outside of the rack 130 through between the two frame supports 224.
(Control Example in the Unloading Process of S2434)

In the present embodiment, for the purpose of simplifying the explanation, when the rack 130 supports a single container 120, an example of the procedure for unloading the container 120 in S2434 will be described by using, as the example, the case in which the transport vehicle 140 without the container 120 unloads the container 120 (which may be referred to as the container T) supported by the rack 130. However, the procedure for unloading the container 120 is not limited to this embodiment. In another embodiment, the transport vehicle 140 loaded with at least one other container 120 may unload the target container 120.

According to the present embodiment, in S2422, the position of the lifting table 902 is adjusted to a specific position below the target rack 130 or the target container 120. Specifically, the position and orientation of the concave portion 920 are adjusted to fit the container T.

In the present embodiment, first, the lifting device control unit 1040 controls the actuator 944 to lift the lifting table 902. The lifting device control unit 1040 may lift the lifting table 902 until the concave portion 920 reaches a position where the container T is supported. When the transport vehicle 140 loaded with at least one other container 120 unloads the target container 120, the lifting device control unit 1040 may raise the lifting table 902 until the container 120 located at the top of the other container 120 reaches a position where the container T is supported.

Next, the traveling control unit 1030 controls the motor 984 to rotate or turn the transport vehicle 140 on the spot. As a result, the container T rotates about an axis substantially perpendicular to the floor 10. The travel control unit 1030 may control the motor 984 so that the container 120 rotates about the center 602 of the circumscribed circle 600 or the center 702 of the 7000.

The travel control unit 1030 adjusts the orientation of the reference surface 126 of the container T in the normal direction so that the reference surface 126 of the container T and the reference surface 226 of the target rack 130 do not satisfy predetermined conditions. As a result, the states of the container T and the rack 130 are switched from the state in which the rack 130 restricts the vertical movement of the container T to the state in which the rack 130 does not restrict the vertical movement of the container T.

Next, the lifting device control unit 1040 controls the actuator 944 to lower the lifting table 902. The lifting device control unit 1040 may lower the lifting table 902 until the upper end of the area 546 of the container T is located below the lower surface of the frame 222. For example, the lifting device control unit 1040 lowers the lifting table 902 to the traveling position. After that, the traveling control unit 1030 controls the motor 984 to rotate or turn the transport vehicle 140 on the spot. As a result, the transport vehicle 140 can move from the inside of the space 322 of the rack 130 to the outside of the rack 130 through between the two frame supports 224.

The container P may be an example of the first container. The container Q may be an example of the first container. The container S may be an example of a third container. The container T may be an example of the first container.

FIG. 25 schematically shows an example of the internal configuration of the control server 160. In the present embodiment, the control server 160 includes a communication control unit 2522, an inventory control unit 2524, an equipment control unit 2526, a request reception unit 2528, and a storage unit 2540. In the present embodiment, the storage unit 2540 includes an article information storage unit 2542, a container information storage unit 2544, a rack information storage unit 2546, and a transport vehicle information storage unit 2548.

In the present embodiment, the communication control unit 2522 controls communication between the control server 160 and at least one of the container 120, the rack 130, the transport vehicle 140, and the picking device 150. The communication control unit 2522 may control the communication between the control server 160 and the user's communication terminal (not shown). The communication method is not particularly limited.

In the present embodiment, the inventory control unit 2524 controls the inventory status of the automated warehouse 100. As a result, the control server 160 can properly store the articles. Specifically, the inventory control unit 2524 manages the information for identifying each of the plurality of articles in association with the information for identifying the container in which the articles are housed. The inventory control unit 2524 manages the information for identifying each of the plurality of containers 120, information for identifying the rack 130 in which the container is loaded, and information indicating the stage of the rack in which the container is placed in association with each other.

In the present embodiment, the equipment control unit 2526 manages at least one of the container 120, the rack 130, the transport vehicle 140, and the picking device 150. The equipment control unit 2526 may manage at least one state of the container 120, the rack 130, the transport vehicle 140, and the picking device 150. The equipment control unit 2526 may control the operation of at least one of the container 120, the rack 130, the transport vehicle 140, and the picking device 150.

For example, the equipment control unit 2526 allocates transport work to each of one or more transport vehicles 140. More specifically, the equipment control unit 2526 transmits to the transport vehicle 140 the information indicating the position of the container 120 to be transported and the position of the transport destination. The equipment control unit 2526 may transmit to the transport vehicle 140 the information indicating the travel route of the transport vehicle 140.

In the present embodiment, the request receiver 2528 receives various requests from at least one of the container 120, the rack 130, the transport vehicle 140, the picking device 150, and the user's communication terminal. The request receiver 2528 may process the above request. For example, the request receiver 2528 receives from each device the information indicating an abnormality in the receiver itself or another device and information requesting that the abnormality is to be dealt with.

In the present embodiment, the storage unit 2540 stores various information used for information processing in the control server 160.

The article information storage unit 2542 stores the information for identifying each of the plurality of articles and the information for identifying the container in which the articles are housed in association with each other. The article information storage unit 2542 may store the information for identifying each of the plurality of articles and the information indicating the specifications of the article in association with each other. Information indicating the specifications of the article includes size, shape, mass, raw material, used by dates, expiration dates, shelf life, and prices. The article information storage unit 2542 may store information for identifying each of the plurality of articles in association with the information regarding the distribution of the article. Examples of information on the distribution of articles include the elapsed time since the articles were stored in the automated warehouse 100, the average retention time of articles with similar types, and the like.

In the present embodiment, the container information storage unit 2544 stores the information that identifies each of the plurality of containers 120 in association with the information that identifies the rack in which the container is loaded. The container information storage unit 2544 may store the information for identifying each of the plurality of containers 120, information for identifying the rack 130 in which the container is loaded, and information indicating the stage of the rack in which the container is arranged in association with each other.

In the present embodiment, the rack information storage unit 2546 stores the information for identifying each of the plurality of racks 130, information indicating the position of the rack, and information indicating the current status of the rack in association with each other. Examples of the current status of the rack 130 include the number of containers 120 loaded in the rack, the number of containers 120 that can be further loaded in the rack, the presence or absence of any abnormality, and the driving status of each drive unit, etc.

In the present embodiment, the transport vehicle information storage unit 2548 stores the information for identifying each of the plurality of transport vehicles 140 in association with the information indicating the current status of the transport vehicle. The current status of the transport vehicle 140 includes the presence or absence of transport work assigned to the transport vehicle, the content of the transport work, the current position of the transport vehicle, the number of containers 120 loaded on the transport vehicle, the number of containers 120 that can be further loaded on the transport vehicle, the presence or absence of any abnormality, the driving status of each driving unit, and so on.

FIG. 26 schematically shows another example of the system configuration of the automated warehouse 2600. In the present embodiment, the automated warehouse 2600 differs from the automated warehouse 100 described with reference to FIGS. 1 to 25 in that it includes a plurality of racks 130 having different positions for supporting the container 120. Regarding the configuration other than the differences described above, the automated warehouse 2600 of FIG. 26 may have the same characteristics as the automated warehouse 100 of FIGS. 1 to 25.

In the present embodiment, the inside of the automated warehouse 2600 is divided into area 2610, area 2622, area 2624, and area 2626. A picking device 150 is arranged in the area 2610. Area 2622 is the area closest to area 2610, and area 2626 is the area farthest from area 2610.

In the present embodiment, the position HT in which each of the one or more racks 130 arranged in the area 2622 supports the container 120 is set to a position higher than the position HM in which each of the one or more racks 130 arranged in the area 2624 supports the container 120. As a result, by using the rack 130 arranged in the area 2622, more containers 120 are carried in and out at one time as compared with the case where the rack 130 arranged in the area 2624 is used.

In the present embodiment, the position HM in which each of the one or more racks 130 arranged in the area 2624 supports the container 120 is set to a position higher than the position HS in which each of the one or more racks 130 arranged in the area 2626 supports the container 120. As a result, by using the rack 130 arranged in the area 2624, more containers 120 are carried in and out at one time as compared with the case where the rack 130 arranged in the area 2626 is used.

Although the present disclosure has been described above using the embodiments, the technical scope of the present disclosure is not limited to the scope described in the embodiments described above.

It will be apparent to those skilled in the art that various changes or improvements can be made to the embodiments described above. Further, to the extent that there is no technical contradiction, the matters described for the specific embodiment can be applied to other embodiments. Further, each component may have the same characteristics as other components having the same name but different reference numerals. It is apparent from the statement of claims that such modifications or improvements may also be included in the technical scope of the disclosure.

It should be noted that each of the operations, procedures, steps, stages, etc. in the devices, systems, programs, and methods shown in the claims, specifications, and drawings can be carried out in any order, unless is particularly expressed as "before" or "prior to". etc., and unless the output of the previous process is used in the subsequent process. The inclusion of the words "first", "next", etc., in the claims, the specification, and the operation flow in the drawings does not mean that it is essential to carry out in this order.

Various embodiments of the present disclosure may be described with reference to flowcharts and block diagrams, wherein the block may be represented by (1) the stage of the process in which the operation is performed or (2) the section of the device responsible for performing the operation. Specific stages and sections may be implemented by dedicated circuits, programmable circuits supplied with computer-readable commands stored on a computer-readable medium, and/or processors supplied with computer-readable commands stored on a computer-readable medium. Dedicated circuits may include digital and/or analog hardware circuits, and may include integrated circuits (ICs) and/or discrete circuits. Programmable circuits may include reconfigurable hardware circuits, including, memory elements such as logical AND, logical OR, logical XOR, logical NAND, logical NOR, and other logical operations, flip-flops, registers, field programmable gate arrays (FPGA), programmable logic arrays (PLA), etc.

The computer-readable medium may include any tangible device capable of storing commands executed by the appropriate device, and as a result, the computer-readable medium having the commands stored therein will include the product, including commands that can be executed to create a means for performing the operation specified in the flowchart or block diagram.

Examples of computer-readable media may include electronic storage media, magnetic storage media, optical storage media, electromagnetic storage media, semiconductor storage media, and the like. More specific examples of computer-readable media include Floppy® disks, diskettes, hard disks, random access memory (RAM), read-only memory (ROM), erasable programmable read-only memory (EPROM or flash memory), electrically erasable programmable read-only memory (EEPROM), static random access memory (SRAM), compact disc read-only memory (CD-ROM), digital versatile disc (DVD), Blu-ray® disc, memory stick, integrated circuit card, or the like.

Computer-readable commands may include either source code or object code written in any combination of one or more programming languages, including object-oriented programming languages such as assembler instructions, instruction set architecture (ISA) instructions, machine instructions, machine-dependent instructions, microcode, firmware instructions, state setting data, or Smalltalk, JAVA®, C++, etc.; and include traditional procedural programming languages such as the "C" programming language or similar programming languages.

Computer-readable instructions may be provided via a local or local area network (LAN), a wide area network (WAN) such as the Internet, etc. with respect to the processor or programmable circuit of a general purpose computer, special purpose computer, or other programmable data processing unit, and may execute computer-readable instructions to create a means for performing the operations specified in the flowchart or block diagram. Examples of processors include computer processors, processing units, microprocessors, digital signal processors, controllers, microcontrollers, and the like.

EXPLANATION OF REFERENCES 10 floor, 20 wall, 100 automated warehouse, 120 container, 124 notch, 126 reference plane, 130 rack, 140 transport vehicle, 150 picking device, 160 control server, 222 frame, 224 frame support, 226 reference plane, 232 wire, 234 wire support, 242 transport vehicle, 244 transport vehicle, 322 space, 324 space, 422 bottom plate, 424 side wall, 430 cover, 440 storage space, 512 lower end, 514 upper end, 522 convex, 542 area, 544 area, 546 area, 552 surface, 600 circumscribed circle, 602 center, 700 circumscribed circle, 702 center, 902 lifting table, 904 lifting device, 906 vehicle body, 920 concave, 942 pantograph, 944 actuator, 960 control unit, 962 sense unit, 964 communication unit, 966 power supply, 980 wheel, 982 drive wheel, 984 motor, 1020 communication control unit, 1030 travel control unit, 1040 lifting device control unit, 1100 circle, 1102 center, 2522 communication control unit, 2524 inventory control unit, 2526 device control unit, 2528 request receiver, 2540 storage unit, 2542 article information storage unit, 2544 container information storage unit, 2546 rack information storage unit, 2548 transport vehicle information storage unit, 2600 automated warehouse, 2610 area, 2622 area, 2624 area, and 2626 area

The invention claimed is:

1. A control device for vehicle control, wherein the control device comprises:
at least one processor configured, when the control device is located within a transport vehicle that is in an environment having a storage rack with a frame formed by frame supports, to perform the following:
outputting control signals for causing the transport vehicle to perform a first movement operation in which the transport vehicle moves to a first position that is in a space between the frame supports;
outputting control signals for causing a first lift operation in which, after the first movement operation, a portion of the transport vehicle that provides a lift surface is raised vertically;
outputting control signals for causing a first rotation operation in which, after the first lift operation, the lift surface is rotated about a vertical axis, from a first orientation relative to the frame supports, to a second orientation relative to the frame supports, wherein the first rotation operation is for:
when a first container having a notch is on the transport vehicle, to switch the first container from being in the first orientation, in which the first container is not supported by the frame supports, to being in the second orientation, in which at least a portion of the frame supports is fitted into the notch so that the first container is supported by the frame supports, or
for switching the first container from the second orientation, in which the at least a portion of the frame supports is fitted into the notch so that the first container is supported by the frame supports, to the first orientation, in which the first container is not supported by the frame supports, to a state in which the frame supports do not restrict vertical movement of the first container when the first container is on the transport vehicle;
outputting control signals for causing a first lowering operation in which, after the first rotation operation, the lift surface is lowered vertically; and
outputting control signals for causing a second rotation operation in which, after the first lowering operation, the lift surface is rotated about the vertical axis from the second orientation to the first orientation; and
outputting control signals for causing a second movement operation in which, after the second rotation operation, the transport vehicle moves away from the storage rack to a second position that is outside of the space between the frame supports.

2. The control device of claim 1, wherein the at least one processor is configured, when the first container having the notch is placed on the transport vehicle, to control the first rotation operation based on an angle between a surface of the first container and a surface of the frame supports.

3. The control device of claim 1, wherein the at least one processor is configured, when the first container is supported by the frame supports, to further perform the following for retrieving the first container from the frame supports:
outputting control signals for causing the transport vehicle to perform a third movement operation in which, after the second movement operation, the transport vehicle moves to the first position in the space between the frame supports;
outputting control signals for causing a second lift operation in which, after the third movement operation, the portion of the transport vehicle that provides the lift surface is raised vertically to a position of the first container;
outputting control signals for causing a third rotation operation in which, after the second lift operation, the lift surface is rotated about the vertical axis to cause the first container to switch from being in the second orientation to being in the first orientation so that the first container is not supported by the frame supports;
outputting control signals for causing a second lowering operation in which, after the third rotation operation, the lift surface is lowered vertically; and
outputting control signals for causing a fourth movement operation in which, after the second lowering operation, the transport vehicle moves away from the storage rack to the second position outside of the space between the frame supports.

4. The control device of claim 1, wherein the at least one processor is configured, when (i) a second container having a notch is placed on the transport vehicle and (ii) the first container is supported on by the frame supports, to perform the following for causing the second container to be stored on the storage rack:
outputting control signals for causing the transport vehicle to perform a third movement operation in which the transport vehicle moves to the first position in the space between the frame supports;

outputting control signals for causing a third rotation operation and a second lift operation in which the lift surface is rotated and lifted in a manner to cause the second container to be in the second orientation, and to cause an upper end of the second container to reach a lower end of the first container;

outputting control signals for causing a fourth rotation operation in which the lift surface is rotated in a manner to cause the first container and the second container to switch from being in the second orientation to being in the first orientation, so that the first container is not supported by the frame supports;

outputting control signals for causing a third lift operation in which the lift surface lifts the first container and the second container vertically and in which the notch of the second container is lifted to a position of the frame supports; and outputting control signals for causing a fifth rotation operation in which, after the notch of the second container is lifted to the position of the frame supports, the lift surface is rotated in a manner to cause the first container and the second container to switch from being in the first orientation to being in the second orientation, so that the second container is supported by the frame supports.

5. The control device of claim 1, wherein the at least one processor is configured, when the control device is located within the transport vehicle in the environment having the frame, to control a lift amount for the first lift operation based on a position of an upper surface of the frame.

6. The control device of claim 1, wherein the control signals for causing the first movement operation are motor signals.

7. The control device of claim 1, wherein the control signals for the first movement operation are configured to cause the transport vehicle to move to a center of a circumscribed circle which circumscribes the space between the frame supports.

8. The control device of claim 1, wherein the first lift operation causes the lift surface to be lifted from a first position, and wherein the first lowering operation causes the lift surface to be lowered back to the first position.

9. A non-transitory computer-readable medium having instructions thereon which, when executed by at least one processor of a control device, causes the at least one processor to perform the following:

outputting control signals for causing, when the control device is located within a transport vehicle that is in an environment having a storage rack with a frame formed by frame supports, a first movement operation to be performed by the transport vehicle, in which the transport vehicle moves to a first position that is in a space between the frame supports;

outputting control signals for causing a first lift operation in which, after the first movement operation, a portion of the transport vehicle that provides a lift surface is raised vertically;

outputting control signals for causing a first rotation operation in which, after the first lift operation, the lift surface is rotated about a vertical axis, from a first orientation relative to the frame supports, to a second orientation relative to the frame supports, wherein the first rotation operation is for:

when a first container having a notch is on the transport vehicle, to switch the first container from being in the first orientation, in which the first container is not supported by the frame supports, to being in the second orientation, in which at least a portion of the frame supports is fitted into the notch so that the first container is supported by the frame supports, or for switching the first container from the second orientation, in which the at least a portion of the frame supports is fitted into the notch so that the first container is supported by the frame supports, to the first orientation, in which the first container is not supported by the frame supports, to a state in which the frame supports do not restrict vertical movement of the first container when the first container is on the transport vehicle;

outputting control signals for causing a first lowering operation in which, after the first rotation operation, the lift surface is lowered vertically; and outputting control signals for causing a second rotation operation in which, after the first lowering operation, the lift surface is rotated about the vertical axis from the second orientation to the first orientation; and outputting control signals for causing a second movement operation in which, after the second rotation operation, the transport vehicle moves away from the storage rack to a second position that is outside of the space between the frame supports.

10. The non-transitory computer-readable medium of claim 9, wherein the instructions, when executed by the at least one processor while the first container is placed on the transport vehicle, to cause the at least one processor to control the first rotation operation based on an angle between a surface of the first container and a surface of the frame supports.

11. The non-transitory computer-readable medium of claim 9, wherein the instructions, when executed by the at least one processor while the first container is supported by the frame supports, further cause the at least one processor to perform the following for retrieving the first container from the frame supports:

outputting control signals for causing the transport vehicle to perform a third movement operation in which, after the second movement operation, the transport vehicle moves to the first position in the space between the frame supports;

outputting control signals for causing a second lift operation in which, after the third movement operation, the portion of the transport vehicle that provides the lift surface is raised vertically to a position of the first container;

outputting control signals for causing a third rotation operation in which, after the second lift operation, the lift surface is rotated about the vertical axis to cause the first container to switch from being in the second orientation to being in the first orientation so that the first container is not supported by the frame supports;

outputting control signals for causing a second lowering operation in which, after the third rotation operation, the lift surface is lowered vertically; and outputting control signals for causing a fourth movement operation in which, after the second lowering operation, the transport vehicle moves away from the storage rack to the second position outside of the space between the frame supports.

12. The non-transitory computer-readable medium of claim 9, wherein the instructions, when executed by the at least one processor while (i) a second container having a notch is placed on the transport vehicle and (ii) the first container is supported on by the frame supports, cause the at least one processor to perform the following for causing the second container to be stored on the storage rack:

outputting control signals for causing the transport vehicle to perform a third movement operation in which the transport vehicle moves to the first position in the space between the frame supports;

outputting control signals for causing a third rotation operation and a second lift operation in which the lift surface is rotated and lifted in a manner to cause the second container to be in the second orientation, and to cause an upper end of the second container to reach a lower end of the first container;

outputting control signals for causing a fourth rotation operation in which the lift surface is rotated in a manner to cause the first container and the second container to switch from being in the second orientation to being in the first orientation, so that the first container is not supported by the frame supports;

outputting control signals for causing a third lift operation in which the lift surface lifts the first container and the second container vertically and in which the notch of the second container is lifted to a position of the frame supports; and outputting control signals for causing a fifth rotation operation in which, after the notch of the second container is lifted to the position of the frame supports, the lift surface is rotated in a manner to cause the first container and the second container to switch from being in the first orientation to being in the second orientation, so that the second container is supported by the frame supports.

13. The non-transitory computer-readable medium of claim 9, wherein the instructions, when executed by the at least one processor while the control device is located within the transport vehicle in the environment having the frame, to cause the at least one processor to control a lift amount for the first lift operation to be based on a position of an upper surface of the frame.

14. The non-transitory computer-readable medium of claim 9, wherein the control signals for causing the first movement operation are motor signals.

15. The non-transitory computer-readable medium of claim 9, wherein the control signals for the first movement operation are configured to cause the transport vehicle to move to a center of a circumscribed circle which circumscribes the space between the frame supports.

16. The non-transitory computer-readable medium of claim 9, wherein the first lift operation causes the lift surface to be lifted from a first position, and wherein the first lowering operation causes the lift surface to be lowered back to the first position.

17. A method performed by a control device for vehicle control, the method comprising:

outputting control signals for causing a first movement operation, wherein the first movement operation is for causing a transport vehicle to move to a first position in a space between frame supports of a frame forming a storage rack;

outputting control signals for causing a first lift operation in which, after the first movement operation, a portion of the transport vehicle that provides a lift surface is raised vertically;

outputting control signals for causing a first rotation operation in which, after the first lift operation, the lift surface is rotated about a vertical axis, from a first orientation relative to the frame supports, to a second orientation relative to the frame supports, wherein the first rotation operation is for:

when a first container having a notch is on the transport vehicle, to switch the first container from being in the first orientation, in which the first container is not supported by the frame supports, to being in the second orientation, in which at least a portion of the frame supports is fitted into the notch so that the first container is supported by the frame supports, or for switching the first container from the second orientation, in which the at least a portion of the frame supports is fitted into the notch so that the first container is supported by the frame supports, to the first orientation, in which the first container is not supported by the frame supports, to a state in which the frame supports do not restrict vertical movement of the first container when the first container is on the transport vehicle;

outputting control signals for causing a first lowering operation in which, after the first rotation operation, the lift surface is lowered vertically; and outputting control signals for causing a second rotation operation in which, after the first lowering operation, the lift surface is rotated about the vertical axis from the second orientation to the first orientation; and outputting control signals for causing a second movement operation in which, after the second rotation operation, the transport vehicle moves away from the storage rack to a second position that is outside of the space between the frame supports.

18. The method of claim 17, wherein the control signals for causing the first movement operation are motor signals.

* * * * *